United States Patent
Park et al.

(10) Patent No.: US 10,531,488 B2
(45) Date of Patent: Jan. 7, 2020

(54) METHOD FOR TRANSMITTING/RECEIVING WIRELESS SIGNAL IN WIRELESS COMMUNICATION SYSTEM AND DEVICE THEREFOR

(71) Applicant: LG ELECTRONICS INC., Seoul (KR)

(72) Inventors: Jonghyun Park, Seoul (KR); Joonkui Ahn, Seoul (KR); Seonwook Kim, Seoul (KR); Kijun Kim, Seoul (KR); Byounghoon Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/751,840

(22) PCT Filed: Aug. 11, 2016

(86) PCT No.: PCT/KR2016/008836
§ 371 (c)(1),
(2) Date: Feb. 9, 2018

(87) PCT Pub. No.: WO2017/026813
PCT Pub. Date: Feb. 16, 2017

(65) Prior Publication Data
US 2018/0235008 A1    Aug. 16, 2018

Related U.S. Application Data

(60) Provisional application No. 62/203,895, filed on Aug. 11, 2015.

(51) Int. Cl.
H04W 28/04    (2009.01)
H04W 74/08    (2009.01)
(Continued)

(52) U.S. Cl.
CPC .......... H04W 74/0808 (2013.01); H04B 7/06 (2013.01); H04W 16/14 (2013.01); H04W 16/28 (2013.01)

(58) Field of Classification Search
CPC . H04W 74/0808; H04W 16/14; H04W 16/28; H04W 74/08; H04B 7/04; H04B 7/06
(Continued)

(56) References Cited

U.S. PATENT DOCUMENTS

2006/0153081 A1    7/2006  Simonsson et al.
2013/0208587 A1    8/2013  Bala et al.
(Continued)

FOREIGN PATENT DOCUMENTS

WO    2014111309    7/2014
WO    2014178678    11/2014

OTHER PUBLICATIONS

PCT International Application No. PCT/KR2016/008836, Written Opinion of the International Searching Authority dated Nov. 23, 2016, 10 pages.
(Continued)

*Primary Examiner* — Sai Ming Chan
(74) *Attorney, Agent, or Firm* — Lee Hong Degerman Kang & Waimey

(57) ABSTRACT

According to one embodiment of the present invention, a method by which a wireless communication device including a plurality of antennas transmits and receives a wireless signal in an unlicensed band in a wireless communication system comprises the steps of: performing a clear channel assessment (CCA) by using the plurality of antennas for a predetermined time interval in the unlicensed band; and transmitting the wireless signal through the unlicensed band when it is determined that the unlicensed band is in an idle state in which the unlicensed band is not occupied by other
(Continued)

wireless communication devices, wherein the step of performing the CCA can comprise the steps of: acquiring one reference value by using energy sensing indicators (ESIs) measured through the plurality of antennas; and comparing the reference value with a CCA threshold value so as to determine whether the unlicensed band is in an idle state.

15 Claims, 12 Drawing Sheets

(51) Int. Cl.
    *H04B 7/06*     (2006.01)
    *H04W 16/28*     (2009.01)
    *H04W 16/14*     (2009.01)

(58) Field of Classification Search
    USPC .......................................................... 370/329
    See application file for complete search history.

(56) References Cited

U.S. PATENT DOCUMENTS

| | | | | |
|---|---|---|---|---|
| 2013/0273833 A1* | 10/2013 | Wang | ................ | H04W 72/0406 455/7 |
| 2015/0049712 A1 | 2/2015 | Chen et al. | | |
| 2015/0055541 A1 | 2/2015 | Zhang et al. | | |
| 2015/0163824 A1* | 6/2015 | Krzymien | ............. | H04W 28/18 370/338 |
| 2015/0195849 A1* | 7/2015 | Bashar | .................. | H04W 16/14 370/330 |
| 2016/0302230 A1* | 10/2016 | Novlan | ................ | H04B 17/318 |
| 2017/0041867 A1* | 2/2017 | Itagaki | ................ | H04W 52/245 |

OTHER PUBLICATIONS

European Patent Office Application Serial No. 16835453.8, Search Report dated Feb. 15, 2019, 11 pages.

3rd Generation Partnership Project (3GPP), "Technical Specification Group Radio Access Network; Evolved Universal Terrestrial Radio Access (E-UTRA); Physical layer; Measurements (Release 12)," 3GPP TS 36.214 V12.2.0, XP050928079, Mar. 2015, 17 pages.

European Patent Office Application No. 16835453.8, Search Report dated Jun. 18, 2019, 11 pages.

* cited by examiner

[Fig. 1]
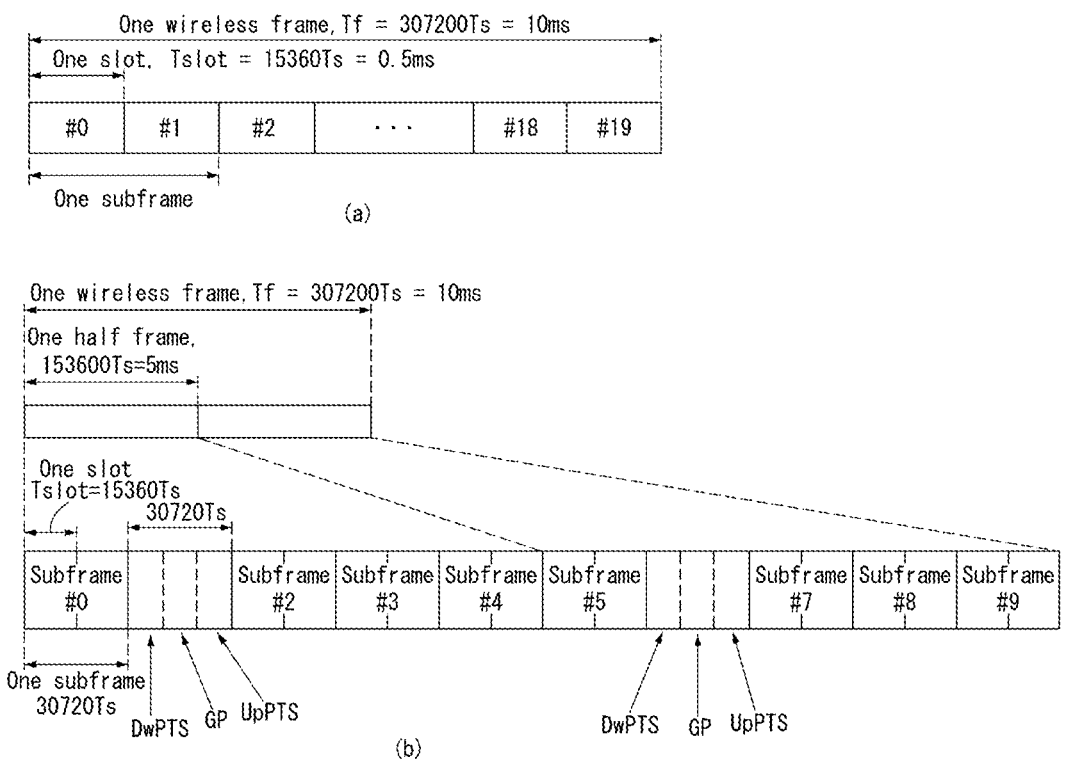

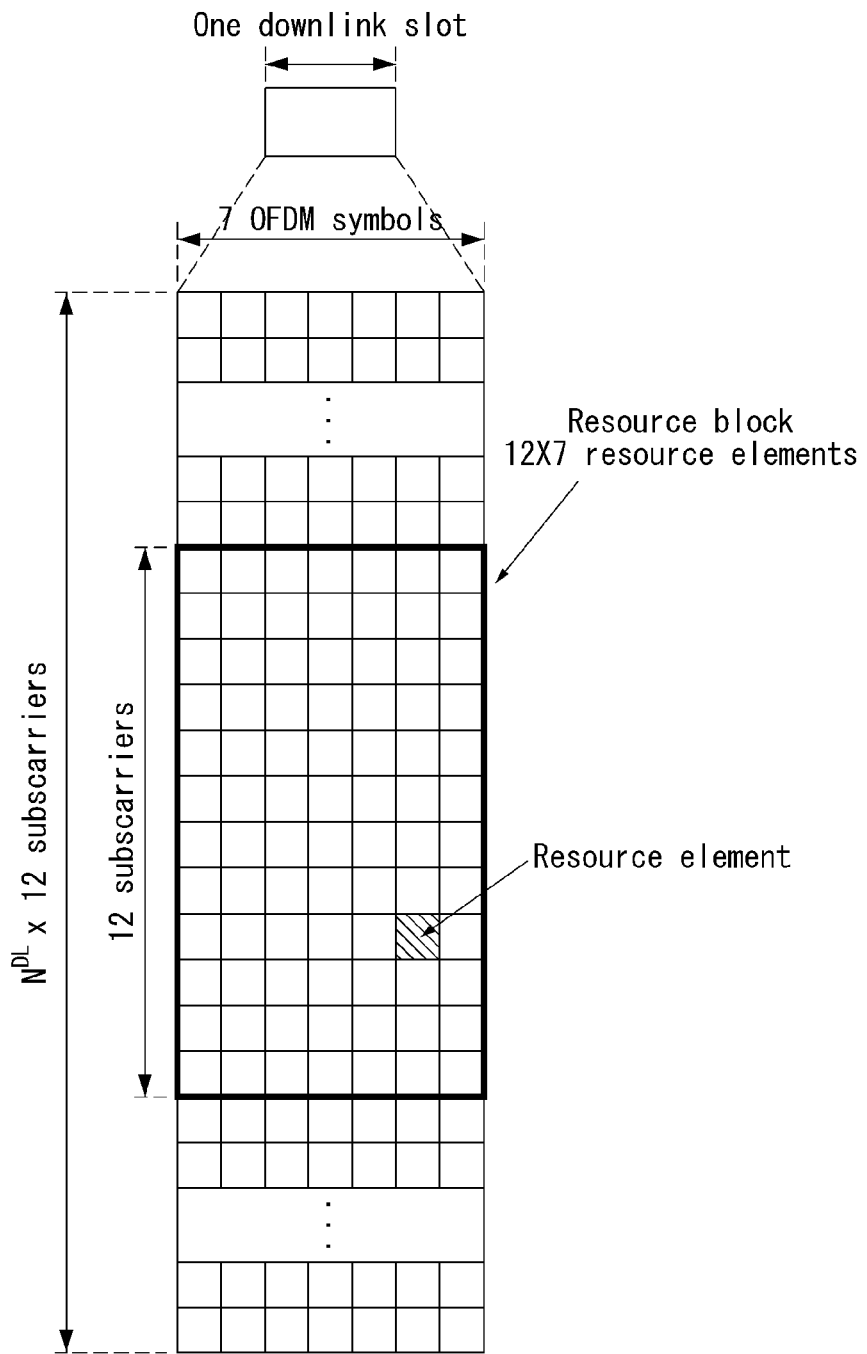
[Fig. 2]

[Fig. 3]
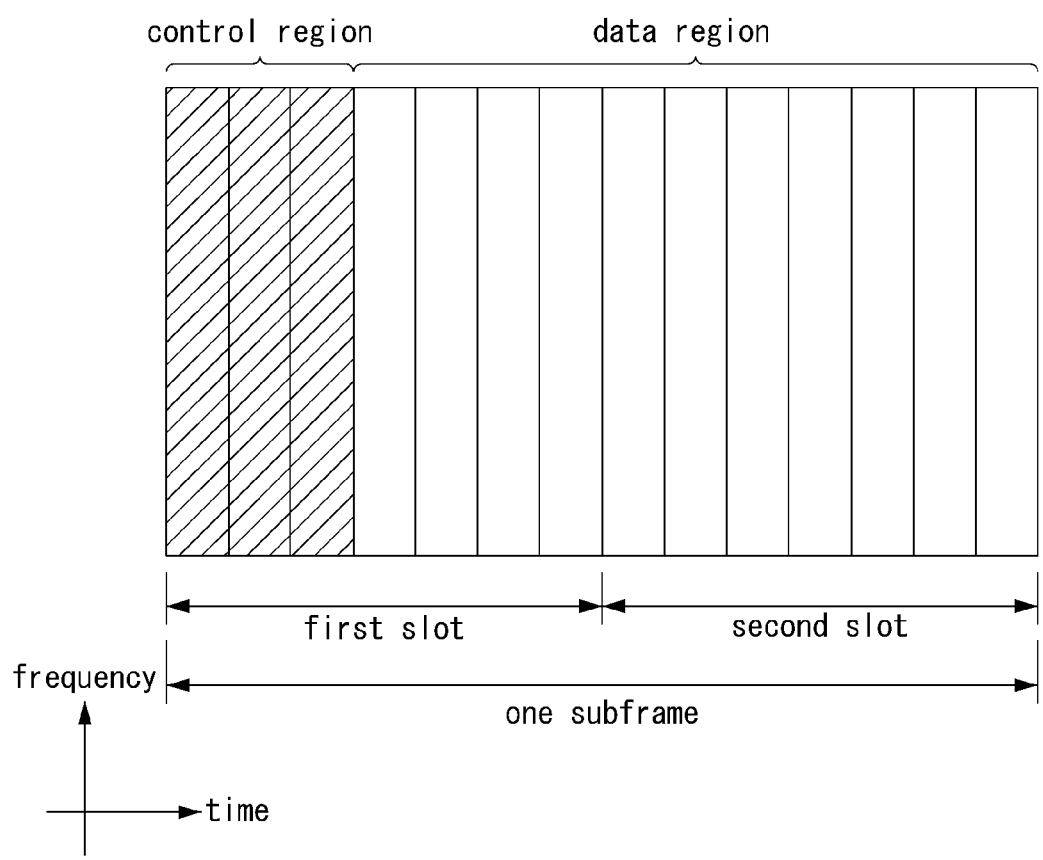

[Fig. 4]
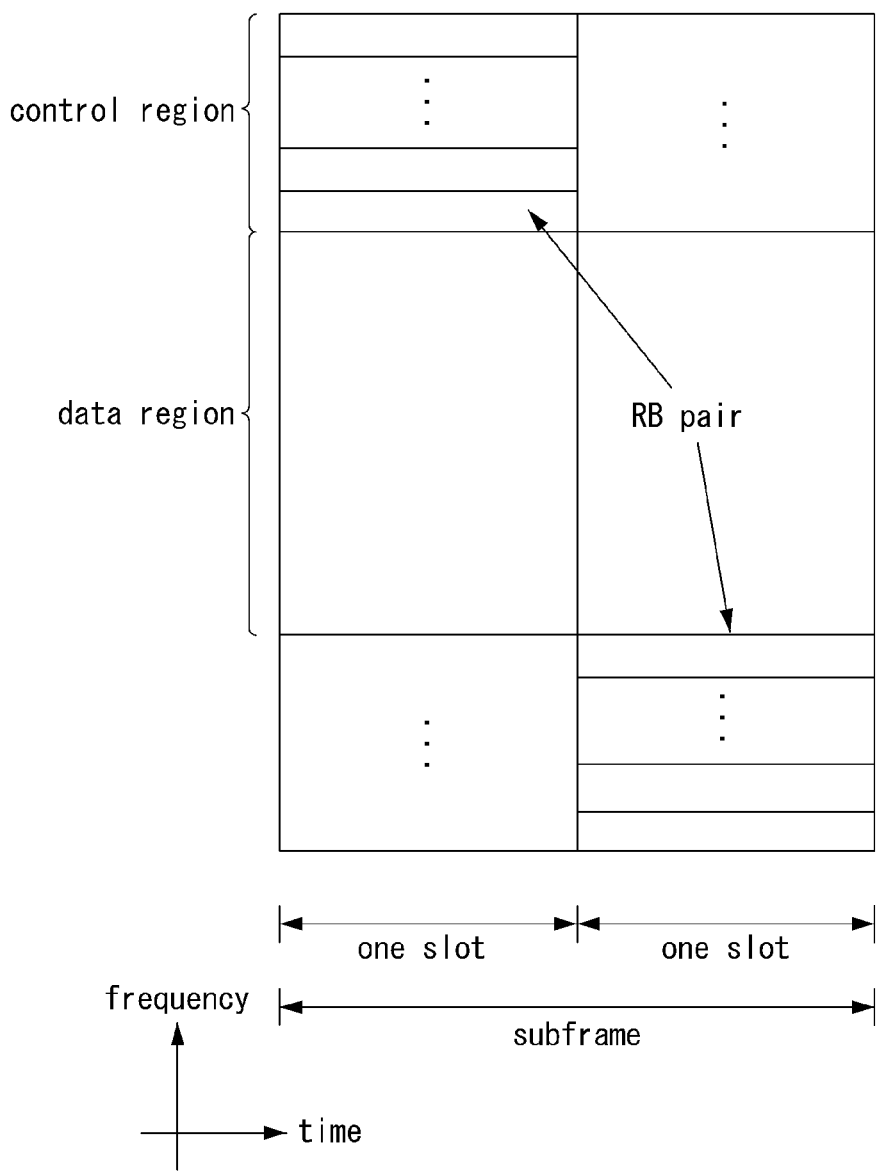

【Fig. 5】
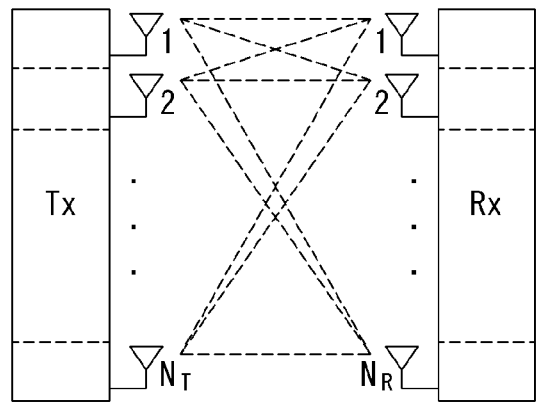
【Fig. 6】
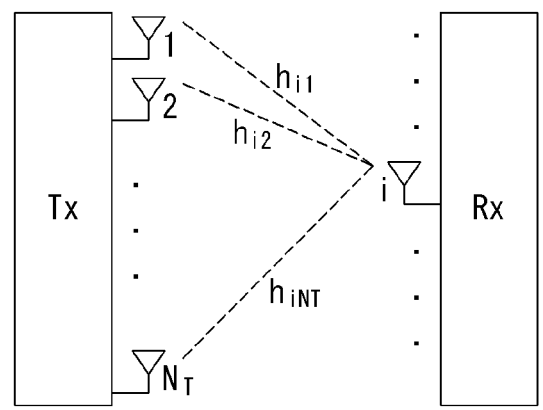

【Fig. 7】
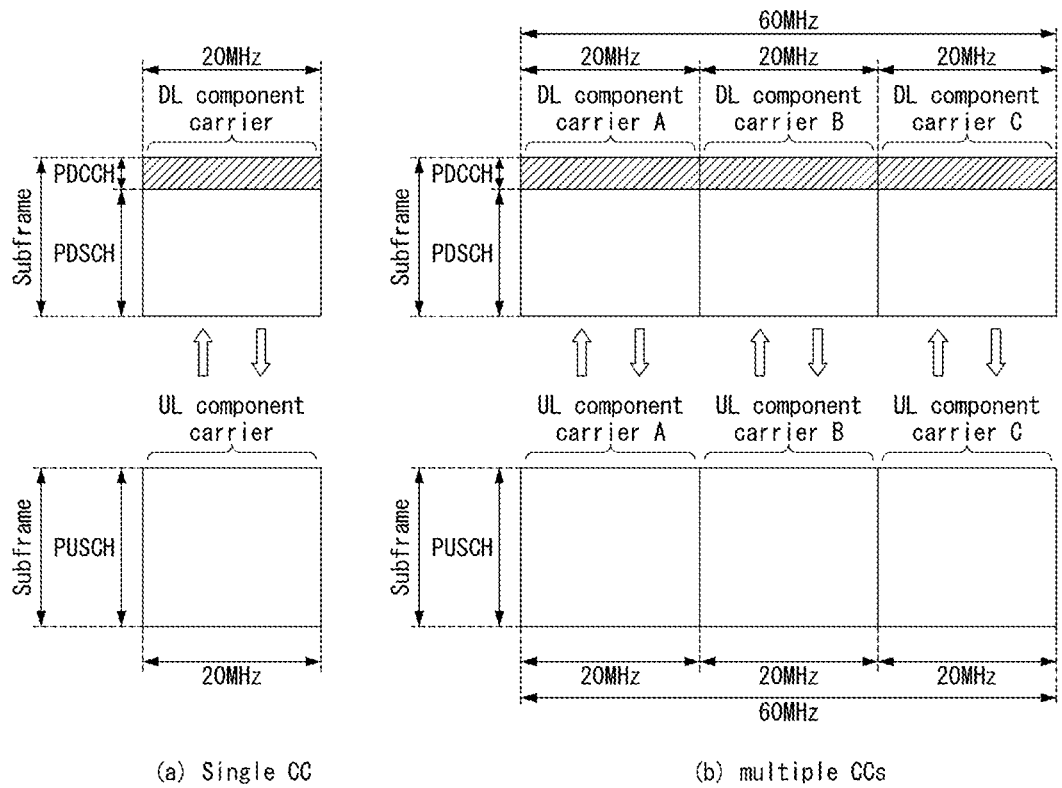
(a) Single CC
(b) multiple CCs

[Fig. 8]
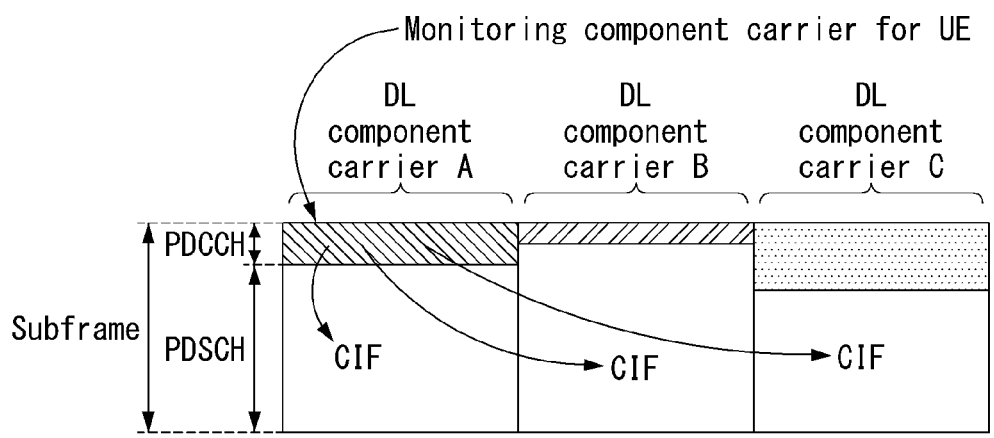
[Fig. 9]
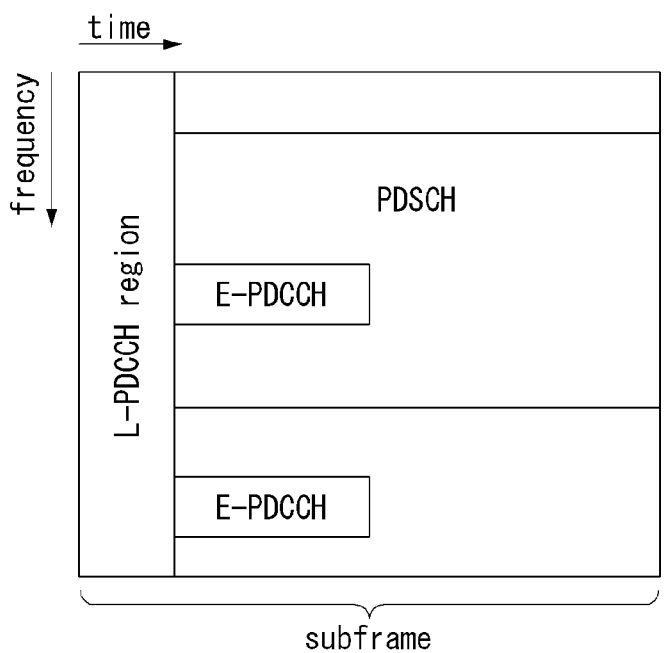

[Fig. 10]
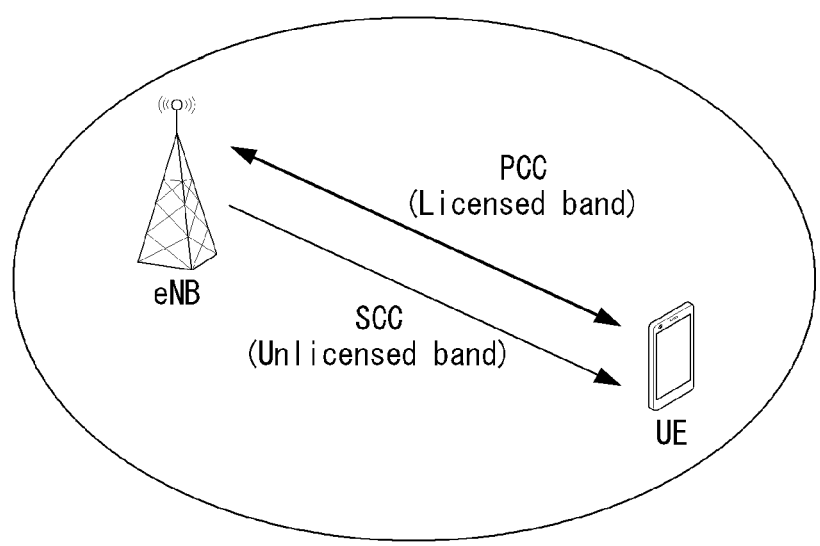

【Fig. 11】
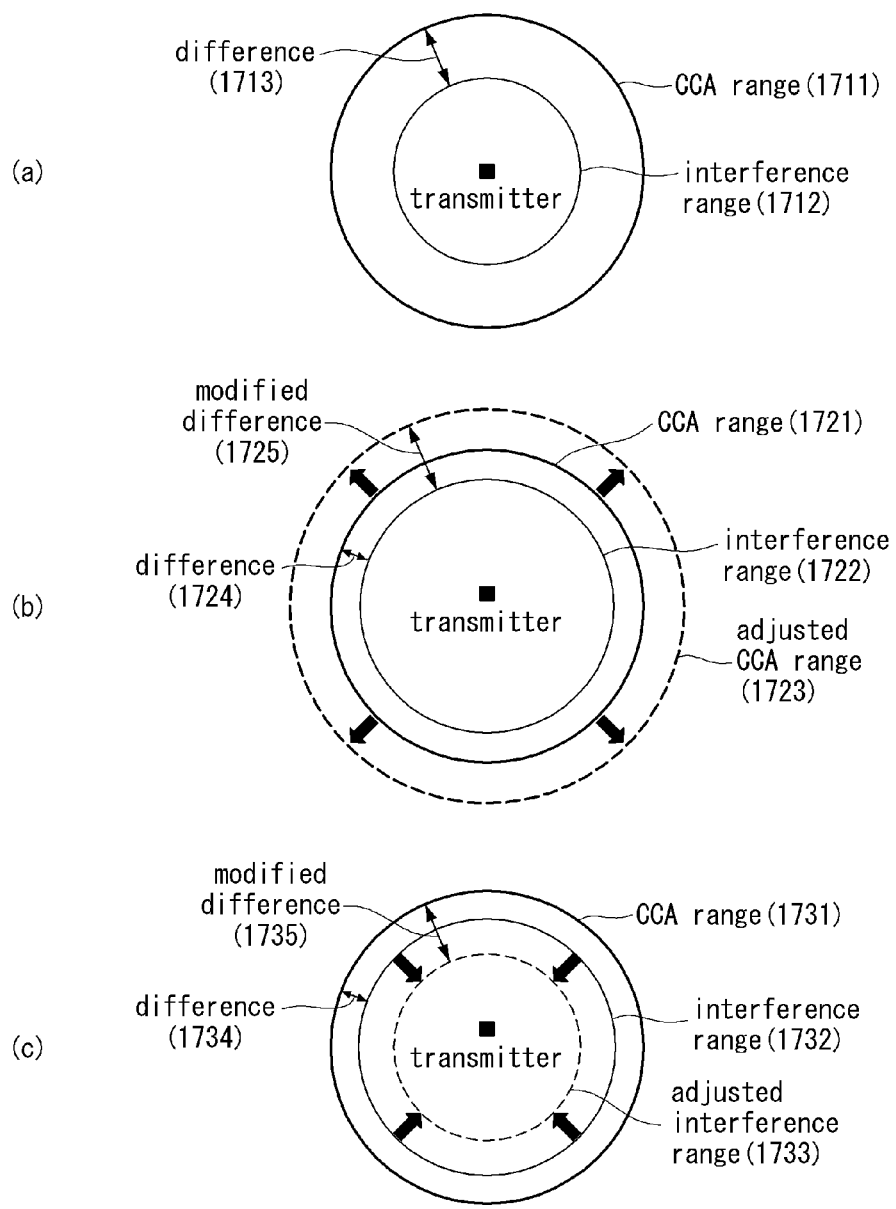

[Fig. 12]
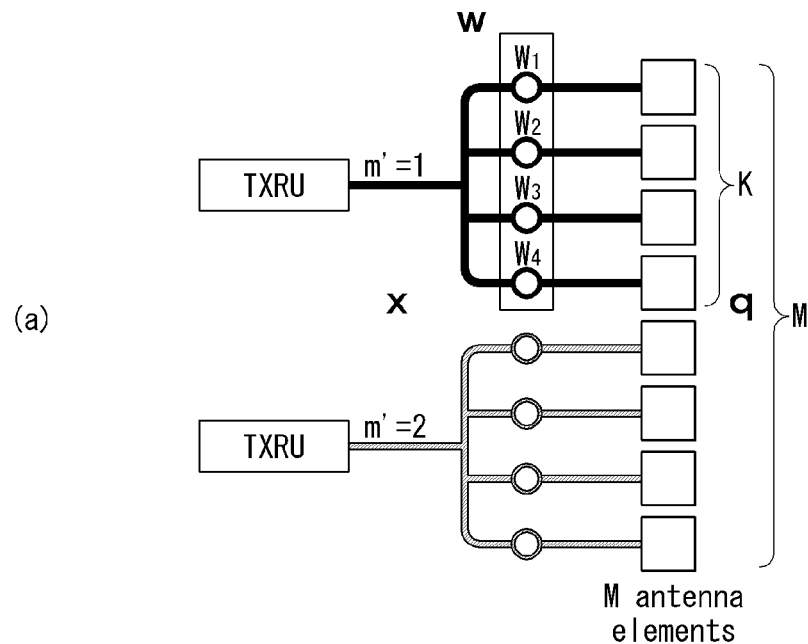
(a)
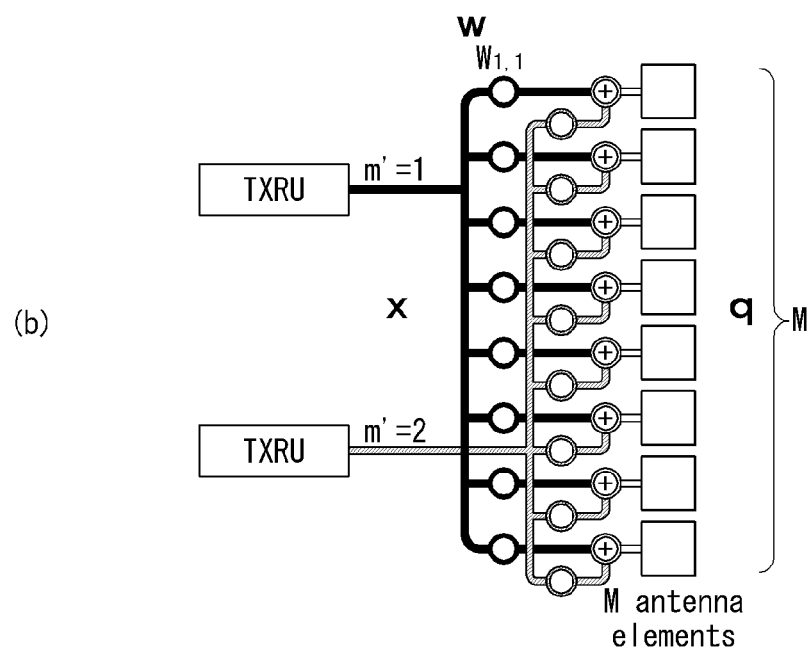
(b)

【Fig. 13】
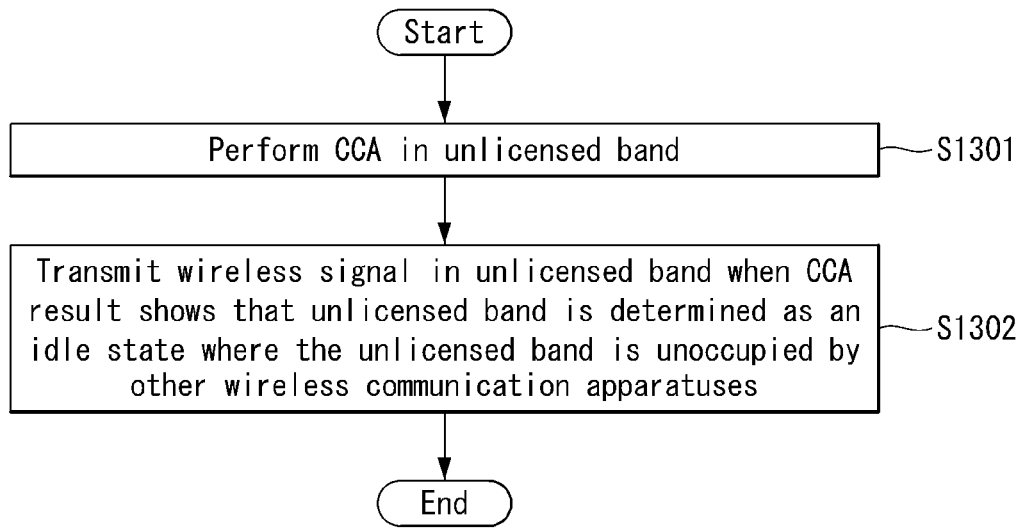
【Fig. 14】
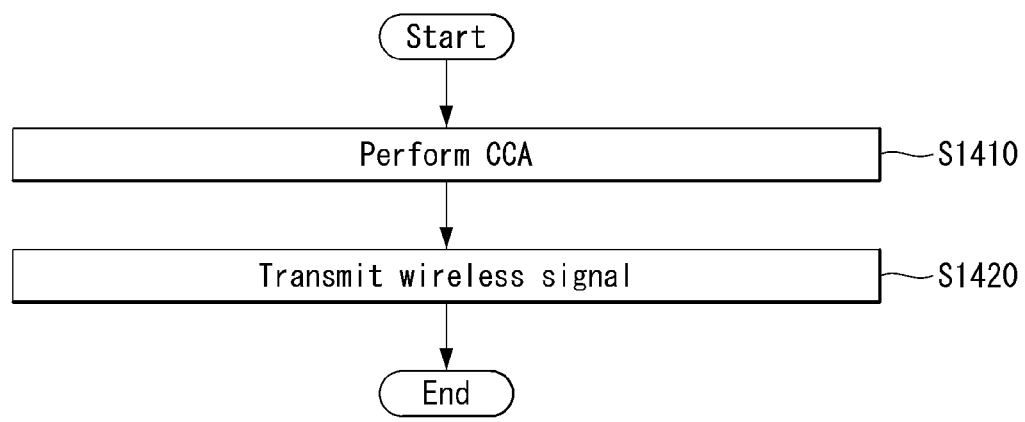

【Fig. 15】
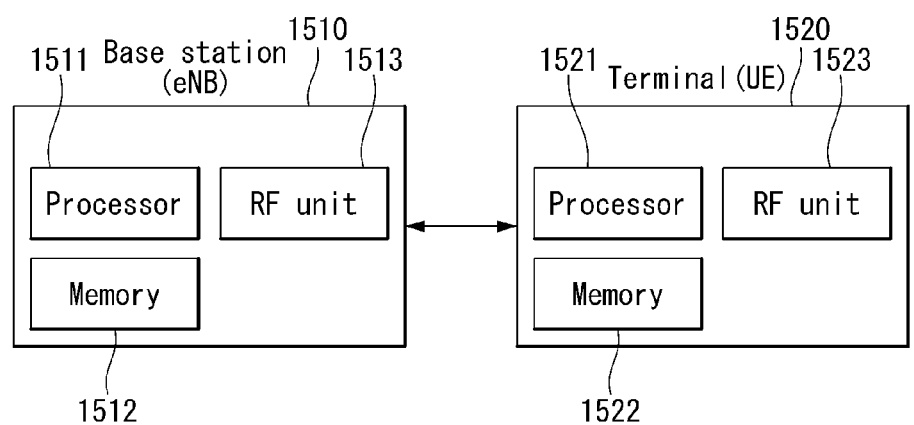

METHOD FOR TRANSMITTING/RECEIVING WIRELESS SIGNAL IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2016/008836, filed on Aug. 11, 2016, which claims the benefit of U.S. Provisional Application No. 62/203,895, filed on Aug. 11, 2015, the contents of which are all hereby incorporated by reference herein in its entirety.

TECHNICAL FIELD

The present invention relates to a wireless communication system and more particularly, a method for transmitting and receiving wireless signals in an unlicensed band and an apparatus supporting the method.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed service, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

In 3GPP, as mobile communication data traffic explosively increases, a service in an unlicensed band/spectrum has been suggested as one of schemes for satisfying the explosive increase of mobile communication data traffic. In this case, in order to send and receive data in an unlicensed band/spectrum, it is necessary to minimize an influence on other communication systems (e.g., an 802.11 system) and to occupy a corresponding band through a contention.

To solve the problem described in detail above, an object of the present invention provides a method for a wireless communication apparatus (for example, user equipment and base station) to transmit and receive wireless signals in an unlicensed band.

Also, an object of the present invention provides a method for controlling a beam area for CCA (Clear Channel Assessment) and a beam area for transmission of a wireless signal when CCA is performed and a wireless signal is transmitted in an unlicensed band.

Another object of the present invention provides a method for solving an ambiguity about with which antenna an energy sensing indicator is to be obtained and used when a wireless communication apparatus including multi-antennas performs CCA.

Technical objects to be achieved by the present invention are not limited to the aforementioned objects, and those skilled in the art to which the present invention pertains may evidently understand other technical objects from the following description.

Technical Solution

One aspect of the present invention provides a method for a wireless communication apparatus including a plurality of antennas to transmit and receive a wireless signal in an unlicensed band in a wireless communication system, the method including: performing CCA (Clear Channel Assessment) using the plurality of antennas for a predetermined time duration in the unlicensed band; and when the unlicensed band is determined as an idle state where the unlicensed band is unoccupied by other communication apparatuses, transmitting a wireless signal through the unlicensed band, wherein the performing of CCA may include: obtaining one reference value using energy sensing indicators (ESIs) measured through the plurality of antennas; and determine whether the unlicensed band is idle state by comparing the reference value with a CCA threshold.

Furthermore, the reference value may be set as the largest, smallest, or average value among the ESIs measured through the plurality of antennas.

Furthermore, the reference value may be set a value no less than any of the ESIs measured through the plurality of antennas.

Furthermore, the CCA threshold may be preset by higher-layer signaling.

Furthermore, when the wireless communication apparatus uses a directional antenna, a first difference between a CCA range and an interference range when the wireless signal is transmitted and received using the directional antenna may be kept the same as a second difference between the CCA range and the interference range when the wireless signal is transmitted and received using an omni-directional antenna.

Further, when a radiation condition related to a total radiated power value is set, an individual radiated power value for each beam direction when a plurality of beams are transmitted may be determined as the total radiated power value divided by the number of beams.

Further, when a radiation condition related to a total radiated power value is set, an individual transmission bandwidth for each beam direction when a plurality of beams are transmitted may be determined as the total system bandwidth divided by the number of beams.

Furthermore, the method for transmitting and receiving a wireless signal in an unlicensed band may further include determining whether the radiation condition is met or not based on an average radiated power value obtained by averaging transmit power values of beams transmitted within a preset frequency region.

Furthermore, while a plurality of candidate scheduling hypothesis sets are preset by higher-layer signaling, the size of the individual transmission bandwidth may be indicated as one of the candidate scheduling hypothesis sets through a scheduling grant.

Furthermore, when a periodic CSI (channel state information) feedback is performed, the frequency unit (granularity) of CSI feedback reporting may be set by taking into account the size of the individual transmission bandwidth.

Furthermore, when CSI feedback is performed, a subband for CSI feedback may be selected as one of pre-defined subband sets, and a PMI (pre coding matrix indicator) to be applied for the selected subband set may be selected as one of pre-defined PMI sets.

Furthermore, when a radiation condition related to a total radiated power value for each beam direction to be radiated during a specific time duration is set, the wireless signal may be transmitted in the total radiated power value for each beam direction, but through different time resources.

Furthermore, the different time resources may be indicated by a base station through a multi-subframe scheduling grant.

Furthermore, the different time resources may be set through inter-cell cooperative signaling exchange.

Furthermore, the method for transmitting and receiving a wireless signal in an unlicensed band may further include determining whether the radiation condition is met or not based on an average radiated power value obtained by averaging transmit power values of beams transmitted within a preset time.

A wireless communication apparatus for transmitting and receiving a wireless signal in an unlicensed band in a wireless communication system according to another embodiment of the present invention may include: an RF (Radio Frequency) unit configured to transmit and receive a wireless signal; and a processor configured to control the RF unit, wherein, when performing CCA (Clear Channel Assessment) using the plurality of antennas for a predetermined time duration in the unlicensed band, the wireless communication apparatus may obtain one reference value using energy sensing indicators (ESIs) measured through the plurality of antennas, determine whether the unlicensed band is idle state by comparing the reference value with a CCA threshold, and transmit a wireless signal through the unlicensed band when the unlicensed band is determined as an idle state where the unlicensed band is unoccupied by other wireless communication apparatuses.

Advantageous Effects

According to an embodiment of the present invention, wireless signals may be transmitted and received in a smooth manner in an unlicensed band.

Also, according to an embodiment of the present invention, interference to other wireless apparatus may be minimized by controlling CCA and a beam area for wireless transmission in an unlicensed band.

Also, according to an embodiment of the present invention, the difference between the CCA range and the interference range when a directional antenna is used may be kept the same as when an omni-directional antenna is used, without increasing the interference range, by using Tx beam sweeping or Tx multi-beams.

An object of the present invention is to solve an ambiguity about with which antenna an energy sensing indicator is to be obtained and used when a wireless communication apparatus including multi-antennas performs CCA.

Advantages which may be obtained by the present invention are not limited to the aforementioned advantages, and various other advantages may be evidently understood by those skilled in the art to which the present invention pertains from the following description.

BRIEF DESCRIPTION OF THE DRAWINGS

The accompanying drawings, which are included herein as a part of a description in order to help understanding of the present invention, provide embodiments of the present invention, and describe the technical features of the present invention with the description below.

FIG. 1 illustrates the structure of a radio frame in a wireless communication system to which an embodiment of the present invention may be applied.

FIG. 2 is a diagram illustrating a resource grid for a downlink slot in a wireless communication system to which an embodiment of the present invention may be applied.

FIG. 3 illustrates the structure of a downlink subframe in a wireless communication system to which an embodiment of the present invention may be applied.

FIG. 4 illustrates the structure of an uplink subframe in a wireless communication system to which an embodiment of the present invention may be applied.

FIG. 5 shows the configuration of a known MIMO communication system.

FIG. 6 is a diagram showing a channel from a plurality of transmission antennas to a single reception antenna.

FIG. 7 shows an example of component carriers and a carrier aggregation in a wireless communication system to which an embodiment of the present invention may be applied.

FIG. 8 shows an example of the structure of a subframe according to cross-carrier scheduling in a wireless communication system to which an embodiment of the present invention may be applied.

FIG. 9 is a diagram illustrating a PDCCH and E-PDCCHs in a wireless communication system to which an embodiment of the present invention may be applied.

FIG. 10 illustrates carrier aggregation in the unlicensed band according to one embodiment of the present invention.

FIG. 11 illustrates a method for transmitting and receiving wireless signals in an unlicensed band according to one embodiment of the present invention.

FIG. 12 illustrates a beam pattern according to one embodiment of the present invention.

FIG. 13 illustrates a method for transmitting a wireless signal in an unlicensed band according to one embodiment of the present invention.

FIG. 14 is a flowchart of a method for transmitting a wireless signal in an unlicensed band according to an embodiment of the present invention.

FIG. 15 illustrates a block diagram of a wireless communication apparatus according to one embodiment of the present invention.

MODE FOR INVENTION

Some embodiments of the present invention are described in detail with reference to the accompanying drawings. A detailed description to be disclosed along with the accompanying drawings is intended to describe some exemplary embodiments of the present invention and is not intended to describe a sole embodiment of the present invention. The following detailed description includes more details in order to provide full understanding of the present invention. However, those skilled in the art will understand that the present invention may be implemented without such more details.

In some cases, in order to avoid making the concept of the present invention vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the device may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (Wi-MAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which an Embodiment of the Present Invention May be Applied

FIG. 1 shows the structure of a radio frame in a wireless communication system to which an embodiment of the present invention may be applied.

3GPP LTE/LTE-A support a radio frame structure type 1 which may be applicable to frequency division duplex (FDD) and a radio frame structure which may be applicable to time division duplex (TDD).

In FIG. 1, the size of the radio frame in a time domain is represented as a multiple of a time unit of $T\_s=1/(15000*2048)$. Downlink and uplink transmission includes a radio frame having a period of $T\_f=307200*T\_s=10$ ms.

FIG. 1(a) illustrates the structure of a type 1 radio frame. The type 1 radio frame may be applied to both full duplex and half duplex FDD.

The radio frame includes 10 subframes. One radio frame includes 20 slots of $T\_slot=15360*T\_s=0.5$ ms in length. 0 to 19 indices are assigned to the respective slots. One subframe includes consecutive 2 slots in the time domain, and a subframe i includes a slot 2i and a slot 2i+1. The time taken to send one subframe is called a transmission time period (TTI). For example, the length of one subframe may be 1 ms, and the length of one slot may be 0.5 ms.

In FDD, uplink transmission and downlink transmission are divided in a frequency domain. There is no limit to full duplex FDD, whereas UE cannot send and receive data at the same time in a half duplex FDD operation.

One slot includes a plurality of orthogonal frequency division multiplexing (OFDM) symbols in the time domain and includes a plurality of resource blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of consecutive subcarriers in one slot.

FIG. 1(b) shows a frame structure type 2.

The frame structure type 2 includes two half frames, each having a length of $153600*T\_s=5$ ms. Each half frame includes 5 subframes, each having a length of $30720*T\_s=1$ ms.

In the frame structure type 2 of a TDD system, an uplink-downlink configuration is a rule indicating whether uplink and downlink are allocated (or reserved) to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, "D" indicates a subframe for downlink transmission, "U" indicates a subframe for uplink transmission, and "S" indicates a special subframe including three types of fields, including a downlink pilot time slot (DwPTS), a guard period (GP), and an uplink pilot time slot (UpPTS).

The DwPTS is used for initial cell search, synchronization or channel estimation in UE. The UpPTS is used for synchronization of uplink transmission for UE and channel estimation in an eNB. The GP is a period for removing interference generated in uplink due to multi-path delay of a downlink signal between uplink and downlink.

Each subframe i includes a slot 2i and a slot 2i+1, each having T_slot=15360*T_s=0.5 ms length.

An uplink-downlink configuration may be classified into 7 types. The positions and/or number of downlink subframes, special subframes, and uplink subframe are different in each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a physical downlink control channel (PDCCH) like other scheduling information. Configuration information may be transmitted to all pieces of UE within a cell through a broadcast channel as broadcasting information.

Table 2 shows the configuration (the length of a DwPTS/GP/UpPTS) of a special subframe.

a subframe and the number of OFDM symbols included in a slot may be changed in various ways.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs NADL included in a downlink slot depends on a downlink transmission bandwidth.

The structure of an uplink slot may be the same as that of a downlink slot.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource

TABLE 2

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| --- | --- | --- | --- | --- | --- | --- |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

The structure of the radio frame according to the example of FIG. 1 is only an example. The number of subcarriers included in a radio frame or the number of slots included in allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some consecutive CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches cyclic redundancy check (CRC) to control information. A unique identifier (a radio network temporary identifier (RNTI)) is masked to the CRC depending on the owner or use of a PDCCH. If the PDCCH is a PDCCH for specific UE, an identifier unique to the UE, for example, a cell-RNTI (C-RNTI) may be masked to the CRC. If the PDCCH is a PDCCH for a paging message, a paging indication identifier, for example, a paging-RNTI (P-RNTI) may be masked to the CRC. If the PDCCH is a PDCCH for system information, more specifically, a system information block (SIB), a system information identifier, for example, a system information-RNTI (SI-RNTI) may be masked to the CRC. A random access-RNTI (RA-RNTI) may be masked to the CRC in order to indicate a random access response which is a response to the transmission of a random access preamble by UE.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A resource block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna."

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

The multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \quad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case, may include a maximum likelihood detection (MLD) receiver, a zero-forcing (ZF)

receiver, a minimum mean square error (MMSE) receiver, diagonal-bell laboratories layered space-time (D-BLAST), and vertical-bell laboratories layered space-time (V-BLAST). In particular, if a transmission end can be aware of channel information, a singular value decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and N_R reception antennas are present.

First, a transmission signal is described below. If the N_T transmission antennas are present as described above, a maximum number of pieces of information which can be transmitted are N_T, which may be represented using the following vector.

$$s=[s_1,s_2,\Lambda,s_{N_T}]^T \quad \text{[Equation 2]}$$

Transmission power may be different in each of pieces of transmission information s_1, s_2, . . . , s_NT. In this case, if pieces of transmission power are P_1, P_2, . . . , P_NT, transmission information having controlled transmission power may be represented using the following vector.

$$\hat{s}=[\hat{s}_1,\hat{s}_2,\Lambda,\hat{s}_{N_T}]^T=[P_1s_1,P_2s_2,\Lambda,P_{N_T}s_{N_T}]^T \quad \text{[Equation 3]}$$

In Equation 3, transmission information having controlled transmission power may be represented as follows using the diagonal matrix P of transmission power.

$$\hat{s} = \begin{bmatrix} P_1 & & & 0 \\ & P_2 & & \\ & & O & \\ 0 & & & P_{N_T} \end{bmatrix} \begin{bmatrix} s_1 \\ s_2 \\ M \\ s_{N_T} \end{bmatrix} = Ps \quad \text{[Equation 4]}$$

The information vector having controlled transmission power in Equation 4 is multiplied by a weight matrix W, thus forming N_T transmission signals x_1, x_2, . . . , x_NT that are actually transmitted. In this case, the weight matrix functions to properly distribute the transmission information to antennas according to a transport channel condition. The following may be represented using the transmission signals x_1, x_2, . . . , x_NT.

$$x = \begin{bmatrix} x_1 \\ x_2 \\ M \\ x_i \\ M \\ x_{N_T} \end{bmatrix} = \begin{bmatrix} w_{11} & w_{12} & \Lambda & w_{1N_T} \\ w_{21} & w_{22} & \Lambda & w_{2N_T} \\ M & & O & \\ w_{i1} & w_{i2} & \Lambda & w_{iN_T} \\ M & & O & \\ w_{N_T1} & w_{N_T2} & \Lambda & w_{N_TN_T} \end{bmatrix} \begin{bmatrix} \hat{s}_1 \\ \hat{s}_2 \\ M \\ \hat{s}_j \\ M \\ \hat{s}_{N_T} \end{bmatrix} = W\hat{s} = WPs \quad \text{[Equation 5]}$$

In Equation 5, w_ij denotes weight between an i-th transmission antenna and a j-th transmission information, and W is an expression of a matrix of the weight. Such a matrix W is called a weight matrix or precoding matrix.

The transmission signal x, such as that described above, may be taken into consideration to be used in the case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, . . . , y_NR of the respective antennas are represented as follows using a vector y.

$$y=[y_1,y_2,\Lambda,y_{N_R}]^T \quad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T=[h_{i1},h_{i2},\Lambda,h_{iN_T}] \quad \text{[Equation 7]}$$

Furthermore, if all channels from the N_T transmission antenna to N_R reception antennas are represented through a matrix expression, such as Equation 7, they may be represented as follows.

$$H = \begin{bmatrix} h_1^T \\ h_2^T \\ M \\ h_i^T \\ M \\ h_{N_R}^T \end{bmatrix} = \begin{bmatrix} h_{11} & h_{12} & \Lambda & h_{1N_T} \\ h_{21} & h_{22} & \Lambda & h_{2N_T} \\ M & & O & \\ h_{i1} & h_{i2} & \Lambda & h_{iN_T} \\ M & & O & \\ h_{N_R1} & h_{N_R2} & \Lambda & h_{N_RN_T} \end{bmatrix} \quad \text{[Equation 8]}$$

Additive white Gaussian noise (AWGN) is added to an actual channel after the actual channel experiences the channel matrix H. Accordingly, AWGN n_1, n_2, . . . , n_NR added to the N_R reception antennas, respectively, are represented using a vector as follows.

$$n=[n_1,n_2,\Lambda,n_{N_R}]^T \quad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ M \\ y_i \\ M \\ y_{N_R} \end{bmatrix} = \begin{bmatrix} h_{11} & h_{12} & \wedge & h_{1N_T} \\ h_{21} & h_{22} & \wedge & h_{2N_T} \\ M & & O & \\ h_{i1} & h_{i2} & \wedge & h_{iN_T} \\ M & & O & \\ h_{N_R1} & h_{N_R2} & \wedge & h_{N_RN_T} \end{bmatrix}$$ [Equation 10]

$$\begin{bmatrix} x_1 \\ x_2 \\ M \\ x_j \\ M \\ x_{N_T} \end{bmatrix} + \begin{bmatrix} n_1 \\ n_2 \\ M \\ n_i \\ M \\ n_{N_R} \end{bmatrix} = Hx + n$$

The number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\mathrm{rank}(H) \leq \min(N_T, N_R)$$ [Equation 11]

Furthermore, if a matrix is subjected to Eigen value decomposition, a rank may be defined as the number of Eigen values that belong to Eigen values and that are not 0. Likewise, if a rank is subjected to singular value decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

General Carrier Aggregation

A communication environment taken into consideration in embodiments of the present invention includes a multi-carrier support environment. That is, a multi-carrier system or carrier aggregation (CA) system that is used in an embodiment of the present invention refers to a system in which one or more Component Carriers (CCs) having a smaller bandwidth than a target bandwidth are aggregated and used when the target wideband is configured in order to support a wideband.

In an embodiment of the present invention, a multi-carrier means an aggregation of carriers (or a carrier aggregation). In this case, an aggregation of carriers means both an aggregation between consecutive carriers and an aggregation between inconsecutive (or non-contiguous) carriers. Furthermore, the number of CCs aggregated between downlink and uplink may be different. A case where the number of downlink CCs (hereinafter called "DL CCs") and the number of uplink CCs (hereinafter called "UL CCs") are the same is called a symmetric aggregation. A case where the number of DL CCs is different from the number of UL CCs is called an asymmetric aggregation. Such the term of a carrier aggregation may be replaced with terms, such as a carrier aggregation, bandwidth aggregation, or spectrum aggregation.

An object of a carrier aggregation configured by aggregating two or more component carriers is to support up to a 100 MHz bandwidth in an LTE-A system. When one or more carriers having a smaller bandwidth than a target bandwidth are aggregated, the bandwidth of the aggregated carriers may be restricted to a bandwidth which is used in an existing system in order to maintain backward compatibility with an existing IMT system. For example, in an existing 3GPP LTE system, {1.4, 3, 5, 10, 15, 20} MHz bandwidths may be supported. In a 3GPP LTE-advanced system (i.e., LTE-A), bandwidths greater than the bandwidth 20 MHz may be supported using only the bandwidths for a backward compatibility with existing systems. Furthermore, in a carrier aggregation system used in an embodiment of the present invention, new bandwidths may be defined regardless of the bandwidths used in the existing systems in order to support a carrier aggregation.

An LTE-A system uses the concept of a cell in order to manage radio resources.

The aforementioned carrier aggregation environment may also be called a multi-cell environment. A cell is defined as a combination of a pair of a downlink resource (DL CC) and an uplink resource (UL CC), but an uplink resource is not an essential element. Accordingly, a cell may consist of a downlink resource only or a downlink resource and an uplink resource. If specific UE has a single configured serving cell, it may have 1 DL CC and 1 UL CC. If specific UE has two or more configured serving cells, it has DL CCs corresponding to the number of cells, and the number of UL CCs may be the same as or smaller than the number of DL CCs.

In some embodiments, a DL CC and an UL CC may be configured in an opposite way. That is, if specific UE has a plurality of configured serving cells, a carrier aggregation environment in which the number of UL CCs is greater than the number of DL CCs may also be supported. That is, a carrier aggregation may be understood as being an aggregation of two or more cells having different carrier frequency (the center frequency of a cell). In this case, the "cell" should be distinguished from a "cell", that is, a region commonly covered by an eNB.

A cell used in an LTE-A system includes a primary cell (PCell) and a secondary cell (SCell). A PCell and an SCell may be used as serving cells. In the case of UE which is in an RRC_CONNECTED state, but in which a carrier aggregation has not been configured or which does not support a carrier aggregation, only one serving cell configured as only a PCell is present. In contrast, in the case of UE which is in the RRC_CONNECTED state and in which a carrier aggregation has been configured, one or more serving cells may be present. A PCell and one or more SCells are included in each serving cell.

A serving cell (PCell and SCell) may be configured through an RRC parameter. PhysCellId is the physical layer identifier of a cell and has an integer value from 0 to 503. SCellIndex is a short identifier which is used to identify an SCell and has an integer value of 1 to 7. ServCellIndex is a short identifier which is used to identify a serving cell (PCell or SCell) and has an integer value of 0 to 7. The value 0 is applied to a PCell, and SCellIndex is previously assigned in order to apply it to an SCell. That is, in ServCellIndex, a cell having the smallest cell ID (or cell index) becomes a PCell.

A PCell means a cell operating on a primary frequency (or a primary CC). A PCell may be used for UE to perform an initial connection establishment process or a connection re-establishment process and may refer to a cell indicated in a handover process. Furthermore, a PCell means a cell that belongs to serving cells configured in a carrier aggregation environment and that becomes the center of control-related communication. That is, UE may receive a PUCCH allocated only in its PCell and send the PUCCH and may use only the PCell to obtain system information or to change a monitoring procedure. An evolved universal terrestrial radio access network (E-UTRAN) may change only a PCell for a handover procedure using the RRC connection reconfiguration (RRCConnectionReconfiguration) message of a higher layer including mobility control information (mobilityControlInfo) for UE which supports a carrier aggregation environment.

An SCell may mean a cell operating on a secondary frequency (or secondary CC). Only one PCell is allocated to specific UE, and one or more SCells may be allocated to the specific UE. An SCell may be configured after RRC connection is established and may be used to provide additional radio resources. A PUCCH is not present in the remaining cells, that is, SCells that belong to serving cells configured in a carrier aggregation environment and that do not include a PCell. When adding an SCell to UE supporting a carrier aggregation environment, an E-UTRAN may provide all types of system information related to the operation of a related cell in the RRC_CONNECTED state through a dedicated signal. A change of system information may be controlled by releasing and adding a related SCell. In this case, the RRC connection reconfiguration (RRCConnectionReconfiguration) message of a higher layer may be used. An E-UTRAN may send dedicated signaling having a different parameter for each UE instead of broadcasting within a related SCell.

After an initial security activation process is started, an E-UTRAN may configure a network including one or more SCells by adding to a PCell that is initially configured in a connection establishing process. In a carrier aggregation environment, a PCell and an SCell may operate respective component carriers. In the following embodiments, a primary component carrier (PCC) may be used as the same meaning as a PCell, and a secondary component carrier (SCC) may be used as the same meaning as an SCell.

FIG. 7 shows an example of component carriers and a carrier aggregation in a wireless communication system to which an embodiment of the present invention may be applied.

FIG. 7(a) shows the structure of a single carrier used in an LTE system. A CC includes a DL CC and an UL CC. One component carrier may have a frequency range of 20 MHz.

FIG. 7(b) shows the structure of a carrier aggregation used in an LTE-A system. FIG. 7(b) shows an example in which 3 component carriers each having a frequency size of 20 MHz have been aggregated. Three DL CCs and three UL CCs have been illustrated in FIG. 9, but the number of DL CCs and UL CCs is not limited. In the case of a carrier aggregation, UE may monitor 3 CCs at the same time, may receive downlink signal/data, and may transmit uplink signal/data.

If N DL CCs are managed in a specific cell, a network may allocate M (M≤N) DL CCs to UE. In this case, the UE may monitor only the M limited DL CCs and receive a DL signal. Furthermore, a network may give priority to L (L≤M≤N) DL CCs and allocate major DL CCs to the UE. In this case, the UE must monitor the L DL CCs. Such a method may be applied to uplink transmission in the same manner.

A linkage between a carrier frequency (or DL CC) of a downlink resource and a carrier frequency (or UL CC) of an uplink resource may be indicated by a higher layer message, such as an RRC message, or system information. For example, a combination of DL resources and UL resources may be configured by a linkage defined by system information block type2 (SIB2). Specifically, the linkage may mean a mapping relationship between a DL CC in which a PDCCH carrying an UL grant is transmitted and an UL CC in which the UL grant is used and may mean a mapping relationship between a DL CC (or UL CC) in which data for an HARQ is transmitted and an UL CC (or DL CC) in which an HARQ ACK/NACK signal is transmitted.

When one or more SCells are configured in UE, a network may activate or deactivate the configured SCell(s). A PCell is always activated. The network activates or deactivates the SCell(s) by transmitting an activation/deactivation MAC control element.

The activation/deactivation MAC control element has a fixed size and consists of a single octet including 7 C-fields and 1 R-field. The C-field is configured for each SCell index (SCellIndex) and is indicative of the activation/deactivation of the SCell. When the value of the C-field is set to "1", it indicates the activation of an SCell having the index of the corresponding SCell. When the value of the C-field is set to "0", it indicates the deactivation of an SCell having the index of the corresponding SCell.

Furthermore, the UE maintains a timer (sCellDeactivationTimer) for each configured SCell and deactivates a related SCell when the timer expires. The same initial timer value is applied to each instance of the timer (sCellDeactivationTimer) and configured by RRC signaling. When an SCell(s) is added or after handover, an initial SCell(s) has been deactivated.

UE performs the following operation on each configured SCell(s) in each TTI.

When the UE receives an activation/deactivation MAC control element that activates an SCell in a specific TTI (subframe n), the UE activates an SCell in a TTI (a subframe n+8 or thereafter) corresponding to predetermined timing, and (re)starts a timer related to the corresponding SCell. The activation of the SCell by the UE means that the UE applies common SCell operations, such as the transmission of a sounding reference signal (SRS) on the SCell, the report of a channel quality indicator (CQI)/precoding matrix indicator (PMI)/rank indication (RI)/precoding type indicator (PTI) for the SCell, PDCCH monitoring on the SCell, and PDCCH monitoring for the SCell.

When the UE receives an activation/deactivation MAC control element that deactivates the SCell in a specific TTI (subframe n) or a timer related to the activated SCell in a specific TTI (subframe n) expires, the UE deactivates the SCell in a TTI (subframe n+8 or thereafter) corresponding to predetermined timing, stops the timer of the corresponding SCell, and flushes the entire HARQ buffer related to the corresponding SCell.

When a PDCCH on the activated SCell is indicative of an uplink grant or downlink assignment or when a PDCCH on a serving cell that schedules the activated SCell is indicative of an uplink grant or downlink assignment for the activated SCell, the UE restarts a timer related to the corresponding SCell.

When the SCell is deactivated, the UE does not transmit an SRS on an SCell, does not report a CQI/PMI/RI/PTI for an SCell, and does not transmit an UL-SCH on an SCell, and does not monitor a PDCCH on an SCell.

Cross-Carrier Scheduling

In a carrier aggregation system, there are two types of a self-scheduling method and a cross-carrier scheduling method from a viewpoint of scheduling for a carrier or serving cell. Cross-carrier scheduling may be called cross component carrier scheduling or cross cell scheduling.

Cross-carrier scheduling means that a PDCCH (DL grant) and a PDSCH are transmitted on different DL CCs or that a PUSCH transmitted according to a PDCCH (UL grant) transmitted in a DL CC is transmitted on an UL CC different from an UL CC link to a DL CC on which the UL grant has been received.

Whether cross-carrier scheduling is to be performed may be activated or deactivated in a UE-specific manner, and each piece of UE may be semi-statically notified of whether cross-carrier scheduling is to be performed through higher layer signaling (e.g., RRC signaling).

If cross-carrier scheduling is activated, there is a need for a carrier indicator field (CIF), providing notification that a PDSCH/PUSCH indicated by a corresponding PDCCH is transmitted through which DL/UL CC, in a PDCCH. For example, a PDCCH may allocate a PDSCH resource or a PUSCH resource to any one of a plurality of CCs using a CI. That is, a CIF is set if a PDCCH on a DL CC allocates a PDSCH or PUSCH resource on one of multiple DL/UL CCs which have been aggregated. In this case, the DCI format of LTE-A Release-8 may be extended according to the CIF. In this case, the set CIF may be fixed to a 3-bit field and the position of the set CIF may be fixed regardless of the size of the DCI format. Furthermore, the PDCCH structure (the same coding and the same CCE-based resource mapping) of LTE-A Release-8 may be reused.

In contrast, if a PDCCH on a DL CC allocates a PDSCH resource on the same DL CC or allocates a PUSCH resource on one linked UL CC, a CIF is not set. In this case, the same PDCCH structure (the same coding and the same CCE-based resource mapping) and DCI format as those of LTE-A Release-8 may be used.

If cross-carrier scheduling is possible, UE needs to monitor a PDCCH for a plurality of DCIs in the control region of a monitoring CC depending on the transmission mode and/or bandwidth of each CC. Accordingly, there is a need for the configuration of a search space capable of supporting such a need and for PDCCH monitoring.

In a carrier aggregation system, a UE DL CC set is indicative of a set of DL CC that has been scheduled for UE to receive a PDSCH, and a UE UL CC set is indicative of a set of UL CCs that has been scheduled for UE scheduled to send a PUSCH. Furthermore, a PDCCH monitoring set is indicative of a set of at least one DL CC on which PDCCH monitoring is performed. A PDCCH monitoring set may be the same as a UE DL CC set or may be a subset of a UE DL CC set. A PDCCH monitoring set may include at least one of DL CCs within a UE DL CC set. Alternatively, a PDCCH monitoring set may be separately defined regardless of a UE DL CC set. A DL CC included in the PDCCH monitoring set may be configured to be always self-scheduled for a linked UL CC. Such a UE DL CC set, UE UL CC set and PDCCH monitoring set may be configured in a UE-specific, UE group-specific or cell-specific manner.

If cross-carrier scheduling has been deactivated, it means that a PDCCH monitoring set is always the same as a UE DL CC set. In such a case, indication, such as separate signaling for the PDCCH monitoring set, is not required. If cross-carrier scheduling has been activated, however, a PDCCH monitoring set may be defined within a UE DL CC set. That is, in order to schedule a PDSCH or a PUSCH for UE, an eNB sends a PDCCH through only the PDCCH monitoring set.

FIG. 8 shows an example of the structure of a subframe according to cross-carrier scheduling in a wireless communication system to which an embodiment of the present invention may be applied.

Referring to FIG. 8, 3 DL CCs are aggregated in a DL subframe for LTE-A UE. A DL CC "A" indicates a case where the DL CC has been configured as a PDCCH monitoring DL CC. If a CIF is not used, each DL CC may send a PDCCH for scheduling its own PDSCH without a CIF. In contrast, if a CIF is used through higher layer signaling, only one DL CC "A" may send a PDCCH for scheduling its own PDSCH or the PDSCH of another CC using a CIF. In this case, DL CCs "B" and "C" not configured as a PDCCH monitoring DL CC do not send a PDCCH.

UE Procedure for Receiving PDSCH

When UE detects a PDCCH of a serving cell on which a DCI format 1, 1A, 1B, 1C, 1D, 2, 2A, 2B or 2C intended for the UE is carried other than a subframe(s) indicated by a higher layer parameter "mbsfn-SubframeConfigList", the UE decodes a corresponding PDSCH in the same subframe with the restriction of the number of transport blocks defined in a higher layer.

UE decodes a PDSCH according to a detected PDCCH with CRC scrambled by an SI-RNTI or P-RNTI on which a DCI format 1A, 10 intended for the UE is carried, and assumes that a PRS is not present in a resource block (RB) on which the corresponding PDSCH is carried.

UE in which a carrier indicator field (CIF) for a serving cell is configured assumes that a CIF is not present in any PDCCH of a serving cell within a common search space.

Otherwise, when PDCCH CRC is scrambled by a C-RNTI or an SPS C-RNTI, UE in which a CIF is configured assumes that a CIF for a serving cell is present in a PDCCH that is located within a UE-specific search space.

When UE is configured by a higher layer so that it decodes a PDCCH with CRC scrambled by an SI-RNTI, the UE decodes the PDCCH and a corresponding PDSCH according to a combination defined in Table 3 below. The PDSCH corresponding to the PDCCH(s) is scrambling-initialized by the SI-RNTI.

Table 3 illustrates a PDCCH and PDSCH configured by an SI-RNTI.

TABLE 3

| DCI FORMAT | SEARCH SPACE | METHOD FOR SENDING PDSCH CORRESPONDING TO PDCCH |
| --- | --- | --- |
| DCI format 1C | common | If the number of PBCH antenna ports is 1, a single antenna port, a port 0 is used, and if not, transmit diversity |
| DCI format 1A | common | If the number of PBCH antenna ports is 1, a single antenna port, a port 0 is used, and if not, transmit diversity |

If UE is configured by a higher layer so that it decodes a PDCCH with CRC scrambled by a P-RNTI, the UE decodes the PDCCH and a corresponding PDSCH according to a combination defined in Table 4 below. The PDSCH corresponding to the PDCCH(s) is scrambling-initialized by the P-RNTI.

Table 4 illustrates a PDCCH and PDSCH configured by a P-RNTI.

TABLE 4

| DCI FORMAT | SEARCH SPACE | METHOD FOR SENDING PDSCH CORRESPONDING TO PDCCH |
| --- | --- | --- |
| DCI format 1C | common | If the number of PBCH antenna ports is 1, a single antenna port, a port 0 is used, and if not, transmit diversity |
| DCI format 1A | common | If the number of PBCH antenna ports is 1, a single antenna port, a port 0 is used, and if not, transmit diversity |

If UE is configured by a higher layer so that it decodes a PDCCH with CRC scrambled by an RA-RNTI, the UE decodes the PDCCH and a corresponding PDSCH according to a combination defined in Table 5 below. The PDSCH corresponding to the PDCCH(s) is scrambling-initialized by the RA-RNTI.

Table 5 illustrates a PDCCH and PDSCH configured by an RA-RNTI.

TABLE 5

| DCI FORMAT | SEARCH SPACE | METHOD FOR SENDING PDSCH CORRESPONDING TO PDCCH |
| --- | --- | --- |
| DCI format 1C | common | If the number of PBCH antenna ports is 1, a single antenna port, a port 0 is used, and if not, transmit diversity |
| DCI format 1A | common | If the number of PBCH antenna ports is 1, a single antenna port, a port 0 is used, and if not, transmit diversity |

UE may be semi-statically configured through higher layer signaling so that it receives PDSCH data transmission signaled through a PDCCH in accordance with any one of 9 transmission modes, including a mode 1 to a mode 9.

In the case of the frame structure type 1,
  UE does not receive a PDSCH RB transmitted in the antenna port 5 even in any subframe in which the number of OFDM symbols for a PDCCH having a common CP is 4.
  If any one of 2 physical resource blocks (PRBs) to which a virtual resource block (VRB) pair is mapped overlaps a frequency in which a PBCH or a primary or secondary synchronous signal is transmitted within the same subframe, UE does not receive a PDSCH RB transmitted in the antenna port 5, 7, 8, 9, 10, 11, 12, 13 or 14 in the corresponding 2 PRBs.
  UE does not receive a PDSCH RB transmitted in the antenna port 7 to which distributed VRB resource allocation has been assigned.
  UE may skip the decoding of a transport block if it does not receive all of allocated PDSCH RBs. If the UE skips the decoding, a physical layer indicates that the transport block has not been successfully decoded for a higher layer.

In the case of the frame structure type 2,
  UE does not receive a PDSCH RB transmitted in the antenna port 5 even in any subframe in which the number of OFDM symbols for a PDCCH having a common CP is 4.
  If any one of 2 PRBs to which a VRB pair is mapped overlaps a frequency in which a PBCH is transmitted within the same subframe, UE does not receive a PDSCH RB transmitted in the antenna port 5 in the corresponding 2 PRBs.
  If any one of 2 PRBs to which a VRB pair is mapped overlaps a frequency in which a primary or secondary synchronous signal is transmitted within the same subframe, UE does not receive a PDSCH RB transmitted in the antenna port 7, 8, 9, 10, 11, 12, 13 or 14 in the corresponding 2 PRBs.
  If a common CP is configured, UE does not receive a PDSCH in the antenna port 5 in which distributed VRB resource allocation has been assigned within a special subframe in an uplink-downlink configuration #1 or #6.
  UE does not receive a PDSCH transmitted in the antenna port 7 to which distributed VRB resource allocation has been assigned.
  UE may skip the decoding of a transport block if it does not receive all of allocated PDSCH RBs. If the UE skips the decoding, a physical layer indicates that the transport block has not been successfully decoded for a higher layer.

If UE is configured by a higher layer so that it decodes a PDCCH with CRC scrambled by a C-RNTI, the UE decodes the PDCCH and a corresponding PDSCH according to each combination defined in Table 6 below. The PDSCH corresponding to the PDCCH(s) is scrambling-initialized by the C-RNTI.

If a CIF for a serving cell is configured in UE or UE is configured by a higher layer so that it decodes a PDCCH with CRC scrambled by a C-RNTI, the UE decodes the PDSCH of a serving cell indicated by a CIF value within the decoded PDCCH.

When UE of the transmission mode 3, 4, 8 or 9 receives DCI format 1A assignment, the UE assumes that PDSCH transmission is related to a transport block 1 and a transport block 2 is disabled.

If UE is set as the transmission mode 7, a UE-specific reference signal corresponding to a PDCCH(s) is scrambling-initialized by a C-RNTI.

If an extended CP is used in downlink, UE does not support the transmission mode 8.

If UE is set as the transmission mode 9, when the UE detects a PDCCH with CRC scrambled by a C-RNTI on which the DCI format 1A or 2C intended for the UE is carried, the UE decodes a corresponding PDSCH in a subframe indicated by a higher layer parameter "mbsfn-SubframeConfigList." However, the subframe configured by a higher layer to decode a PMCH or, the subframe configured by a higher layer to be part of a PRS occasion and the PRS occasion is configured only within an MBSFN subframe and the length of a CP used in a subframe #0 is a common CP is excluded.

Table 6 illustrates a PDCCH and PDSCH configured by a C-RNTI.

TABLE 6

| TRANSMISSION MODE | DCI FORMAT | SEARCH SPACE | METHOD FOR SENDING PDSCH CORRESPONDING TO PDCCH |
|---|---|---|---|
| Mode 1 | DCI format 1A | common and UE-specific by a C-RNTI | a single antenna port, a port 0 |
|  | DCI format 1 | UE-specific by a C-RNTI | a single antenna port, a port 0 |
| Mode 2 | DCI format 1A | common and UE-specific by a C-RNTI | transmit diversity |
|  | DCI format 1 | UE-specific by a C-RNTI | transmit diversity |
| Mode 3 | DCI format 1A | common and UE-specific by a C-RNTI | transmit diversity |
|  | DCI format 2A | UE-specific by a C-RNTI | large delay CDD or transmit diversity |
| Mode 4 | DCI format 1A | common and UE-specific by a C-RNTI | transmit diversity |
|  | DCI format 2 | UE-specific by a C-RNTI | closed-loop spatial multiplexing or transmit diversity |
| Mode 5 | DCI format 1A | common and UE-specific by a C-RNTI | transmit diversity |
|  | DCI format 1D | UE-specific by a C-RNTI | multi-user MIMO |
| Mode 6 | DCI format 1A | common and UE-specific by a C-RNTI | transmit diversity |
|  | DCI format 1B | UE-specific by a C-RNTI | closed-loop spatial multiplexing using a single transport layer |
| Mode 7 | DCI format 1A | common and UE-specific by a C-RNTI | If the number of PBCH antenna ports is 1, a single antenna port, a port 0 is used, and if not, transmit diversity |
|  | DCI format 1 | UE-specific by a C-RNTI | Single antenna port, a port 5 |
| Mode 8 | DCI format 1A | common and UE-specific by a C-RNTI | If the number of PBCH antenna ports is 1, a single antenna port, a port 0 is used, and if not, transmit diversity |
|  | DCI format 2B | UE-specific by a C-RNTI | dual layer transmission, ports 7 and 8 or a single antenna port, a port 7 or 8 |
| Mode 9 | DCI format 1A | common and UE-specific by a C-RNTI | Non-MBSFN subframe: if the number of PBCH antenna ports is 1, a single antenna port, a port 0 is used, and if not, transmit diversity MBSFN subframe: a single antenna port, a port 7 |
|  | DCI format 2C | UE-specific by a C-RNTI | layer transmission up to a maximum of 8, ports 7-14 |

If UE is configured by a higher layer so that it decodes a PDCCH with CRC scrambled by an SPS C-RNTI, the UE decodes a PDCCH of a primary cell and a corresponding PDSCH of the primary cell according to each combination defined in Table 7 below. If a PDSCH is transmitted without a corresponding PDCCH, the same PDSCH-related configuration is applied. The PDSCH corresponding to the PDCCH and the PDSCH not having a PDCCH is scrambling-initialized by the SPS C-RNTI.

If UE is set as the transmission mode 7, a PDCCH(s) and a corresponding UE-specific reference signal is scrambling-initialized by an SPS C-RNTI.

If UE is set as the transmission mode 9, when the UE detects a PDCCH with CRC scrambled by an SPS C-RNTI on which the DCI format 1A or 2C intended for the UE is carried or a PDSCH configured without a PDCCH intended for the UE, the UE decodes a corresponding PDSCH in a subframe indicated by a higher layer parameter "mbsfn-SubframeConfigList." However, the subframe configured a higher layer to decode a PMCH or, the subframe configured by a higher layer to be part of a PRS occasion and the PRS occasion is configured only within an MBSFN subframe and the CP length used in a subframe #0 is a common CP is excluded.

Table 7 illustrates a PDCCH and PDSCH configured by an SPS C-RNTI.

TABLE 7

| TRANSMISSION MODE | DCI FORMAT | SEARCH SPACE | METHOD FOR SENDING PDSCH CORRESPONDING TO PDCCH |
|---|---|---|---|
| Mode 1 | DCI format 1A | common and UE-specific by a C-RNTI | a single antenna port, a port 0 |
| | DCI format 1 | UE-specific by a C-RNTI | a single antenna port, a port 0 |
| Mode 2 | DCI format 1A | common and UE-specific by a C-RNTI | transmit diversity |
| | DCI format 1 | UE-specific by a C-RNTI | transmit diversity |
| Mode 3 | DCI format 1A | common and UE-specific by a C-RNTI | transmit diversity |
| | DCI format 2A | UE-specific by a C-RNTI | transmit diversity |
| Mode 4 | DCI format 1A | common and UE-specific by a C-RNTI | transmit diversity |
| | DCI format 2 | UE-specific by a C-RNTI | transmit diversity |
| Mode 5 | DCI format 1A | common and UE-specific by a C-RNTI | transmit diversity |
| Mode 6 | DCI format 1A | common and UE-specific by a C-RNTI | transmit diversity |
| Mode 7 | DCI format 1A | common and UE-specific by a C-RNTI | a single antenna port, a port 5 |
| | DCI format | UE-specific by a C-RNTI | a single antenna port, a port 5 |
| Mode 8 | DCI format 1A | common and UE-specific by a C-RNTI | a single antenna port, a port 7 |
| | DCI format 2B | UE-specific by a C-RNTI | a single antenna port, a port 7 or 8 |
| Mode 9 | DCI format 1A | common and UE-specific by a C-RNTI | a single antenna port, a port 7 |
| | DCI format 2C | UE-specific by a C-RNTI | a single antenna port, a port 7 or 8 |

If UE is configured by a higher layer so that it decodes a PDCCH with CRC scrambled by a temporary C-RNTI and is configured to not decode a PDCCH with CRC scrambled by a C-RNTI, the UE decodes a PDCCH and a corresponding PDSCH according to a combination defined in Table 8. The PDSCH corresponding to the PDCCH(s) is scrambling-initialized by the temporary C-RNTI.

Table 8 illustrates a PDCCH and a PDSCH configured by a temporary C-RNTI.

TABLE 8

| DCI FORMAT | SEARCH SPACE | METHOD FOR SENDING PDSCH CORRESPONDING TO PDCCH |
|---|---|---|
| DCI format 1A | common and UE-specific by a temporary C-RNTI | If the number of PBCH antenna ports is 1, a single antenna port, a port 0 is used, and if not, transmit diversity |
| DCI format 1 | UE-specific by a temporary C-RNTI | If the number of PBCH antenna ports is 1, a single antenna port, a port 0 is used, and if not, transmit diversity | a PDCCH with CRC scrambled by a C-RNTI, the UE decodes the PDCCH according to a combination defined in Table 9 and sends the corresponding PUSCH. The PUSCH transmission corresponding to the PDCCH(s) and the PUSCH retransmission for the same transport block is scrambling-initialized by the C-RNTI. The transmission mode 1 is a default uplink transmission mode until an uplink transmission mode is assigned in the UE by higher layer signaling.

UE Procedure for PUSCH Transmission

UE is semi-statically configured through higher layer signaling so that it performs PUSCH transmission signaled through a PDCCH according to any one of two types of uplink transmission modes 1 and 2 defined in Table 9 below. If the UE is configured by a higher layer so that it decodes When UE is configured as the transmission mode 2 and receives a DCI format 0 uplink scheduling grant, the UE assumes that PUSCH transmission is related to a transport block 1 and a transport block 2 is disabled.

Table 9 illustrates a PDCCH and a PUSCH configured by a C-RNTI.

TABLE 9

| TRANSMISSION MODE | DCI FORMAT | SEARCH SPACE | METHOD FOR SENDING PUSCH CORRESPONDING TO PDCCH |
|---|---|---|---|
| mode 1 | DCI format 0 | common and UE-specific by a C-RNTI | a single antenna port, a port 10 |
| mode 2 | DCI format 0 | common and UE-specific by a C-RNTI | a single antenna port, a port 10 |

TABLE 9-continued

| TRANSMISSION MODE | DCI FORMAT | SEARCH SPACE | METHOD FOR SENDING PUSCH CORRESPONDING TO PDCCH |
|---|---|---|---|
| | DCI format 4 | UE-specific by a C-RNTI | closed-loop spatial multiplexing |

If UE is configured by a higher layer so that it decodes a PDCCH with CRC scrambled by a C-RNTI and also configured to receive a random access procedure started by a PDCCH order, the UE decodes the PDCCH according to a combination defined in Table 10 below.

Table 10 illustrates a PDCCH set as a PDCCH order for starting a random access procedure.

TABLE 10

| DCI FORMAT | SEARCH SPACE |
|---|---|
| DCI format 1A | common and UE-specific by a C-RNTI |

If UE is configured by a higher layer so that it decodes a PDCCH with CRC scrambled by an SPS C-RNTI, the UE decodes the PDCCH according to a combination defined in Table 11 below and sends a corresponding PUSCH. The PUSCH transmission corresponding to the PDCCH(s) and the PUSCH retransmission for the same transport block is scrambling-initialized by the SPS C-RNTI. PUSCH retransmission for the same transport block as the minimum transmission of a PUSCH without a corresponding PDCCH is scrambling-initialized by an SPS C-RNTI.

Table 11 illustrates a PDCCH and a PUSCH configured by an SPS C-RNTI.

TABLE 11

| TRANSMISSION MODE | DCI FORMAT | SEARCH SPACE | METHOD FOR SENDING PUSCH CORRESPONDING TO PDCCH |
|---|---|---|---|
| mode 1 | DCI format 0 | common and UE-specific by a C-RNTI | a single antenna port, a port 10 |
| mode 2 | DCI format 0 | common and UE-specific by a C-RNTI | a single antenna port, a port 10 |

If UE is configured by a higher layer so that it decodes a PDCCH scrambled by a temporary C-RNTI regardless of whether the UE has been configured to decode a PDCCH with CRC scrambled by a C-RNTI, the UE decodes the PDCCH according to a combination defined in Table 12 and sends a corresponding PUSCH. The PUSCH corresponding to the PDCCH(s) is scrambling-initialized by the temporary C-RNTI.

If a temporary C-RNTI is set by a higher layer, PUSCH transmission corresponding to a random access response grant and PUSCH retransmission for the same transport block are scrambled by the temporary C-RNTI. If not, the PUSCH transmission corresponding to the random access response grant and the PUSCH retransmission for the same transport block are scrambled by a C-RNTI.

Table 12 illustrates a PDCCH configured by a temporary C-RNTI.

TABLE 12

| DCI FORMAT | SEARCH SPACE |
|---|---|
| DCI format 0 | common |

If UE is configured by a higher layer so that it decodes a PDCCH with CRC scrambled by a TPC-PUCCH-RNTI, the UE decodes the PDCCH according to a combination defined in Table 13 below. In Table 13, indication "3/3A" means that UE receives the DCI format 3 or a DCI format depending on a configuration.

Table 13 illustrates a PDCCH configured by a TPC-PUCCH-RNTI.

TABLE 13

| DCI FORMAT | SEARCH SPACE |
|---|---|
| DCI formats 3/3A | common |

If UE is configured by a higher layer so that it decodes a PDCCH with CRC scrambled by a TPC-PUSCH-RNTI, the UE decodes the PDCCH according to a combination defined in Table 14 below. In Table 14, indication "3/3A" includes that UE receives the DCI format 3 or a DCI format depending on a configuration.

Table 14 illustrates a PDCCH configured by a TPC-PUSCH-RNTI.

TABLE 14

| DCI FORMAT | SEARCH SPACE |
|---|---|
| DCI formats 3/3A | common |

Cross-Carrier Scheduling and E-PDCCH Scheduling

In the 3GPP LTE Rel-10 system, a cross-CC scheduling operation is defined as follows in a situation in which a plurality of component carriers (CCs)=(serving)cells) has been aggregated. One CC (i.e., scheduled CC) may be previously configured so that DL/UL scheduling is performed by only a specific one CC (i.e., scheduling CC) (i.e., so that a DL/UL grant PDCCH for a corresponding scheduled CC is received). Furthermore, the corresponding scheduling CC may basically perform DL/UL scheduling therefor. In other words, a search space (SS) for a PDCCH that schedules a scheduling/scheduled CC within a cross-CC scheduling relation may be fully present in the control channel region of the scheduling CC.

In the LTE system, an FDD DL carrier or TDD DL subframes, as described above, use the first n OFDM symbols of a subframe to send a PDCCH, a PHICH, and a PCFICH, that is, physical channels for sending various types of control information, and use the remaining OFDM symbols for PDSCH transmission. In this case, the number of symbols used for control channel transmission in each subframe is transferred to UE dynamically through a physical channel, such as a PCFICH or in a semi-static manner through RRC signaling. In this case, characteristically, an "n" value may be set to 1 symbol to a maximum of 4 symbols depending on subframe characteristics and system characteristics (e.g., FDD/TDD or a system bandwidth).

In an existing LTE system, a PDCCH, that is, a physical channel for DL/UL scheduling and the transmission of various types of control information, has a limit because it is transmitted through restricted OFDM symbols.

Accordingly, an enhanced PDCCH (i.e., an E-PDCCH) that is more freely multiplexed into a PDSCH using an FDM/TDM method may be introduced instead of a control channel transmitted through an OFDM symbol separated from a PDSCH like a PDCCH.

FIG. 9 is a diagram illustrating a PDCCH and E-PDCCHs in a wireless communication system to which an embodiment of the present invention may be applied.

Referring to FIG. 9, a legacy PDCCH (i.e., L-PDCCH) is transmitted in the first n OFDM symbols of a subframe, and E-PDCCHs are multiplexed into a PDSCH using an FDM/TDM method and transmitted.

Quasi Co-Located (QCL) Between Antenna Ports

Quasi co-located and quasi co-location (QC/QCL) may be defined as follows.

If two antenna ports have a QC/QCL relation (or subjected to QC/QCL), UE may assume that the large-scale property of a signal transferred through one antenna port may be inferred from a signal transferred through the other antenna port. In this case, the large-scale property includes one or more of Delay spread, Doppler spread, Frequency shift, Average received power, and Received timing.

Furthermore, the following may be defined. Assuming that two antenna ports have a QC/QCL relation (or subjected to QC/QCL), UE may assume that the large-scale property of a channel of which one symbol is transferred through one antenna port may be inferred from a wireless channel of which one symbol is transferred through the other antenna port. In this case, the large-scale property includes one or more of Delay spread, Doppler spread, Doppler shift, Average gain, and Average delay.

That is, if two antenna ports have a QC/QCL relation (or subjected to QC/QCL), it means that the large-scale property of a wireless channel from one antenna port is the same as the large-scale property of a wireless channel from the other antenna port. Assuming that a plurality of antenna ports in which an RS is transmitted is taken into consideration, if antenna ports on which two types of different RSs are transmitted have a QCL relation, the large-scale property of a wireless channel from one antenna port may be replaced with the large-scale property of a wireless channel from the other antenna port.

In this specification, the QC/QCL-related definitions are not distinguished. That is, the QC/QCL concept may comply with one of the definitions. In a similar other form, the QC/QCL concept definition may be changed in a form in which antenna ports having an established QC/QCL assumption may be assumed to be transmitted at the same location (i.e., co-location) (e.g., UE may assume antenna ports to be antenna ports transmitted at the same transmission point). The spirit of the present invention includes such similar modifications. In an embodiment of the present invention, the QC/QCL-related definitions are interchangeably used, for convenience of description.

In accordance with the concept of the QC/QCL, UE may not assume the same large-scale property between wireless channels from corresponding antenna ports with respect to non-QC/QCL antenna ports. That is, in this case, UE may perform independent processing on timing acquisition and tracking, frequency offset estimation and compensation, delay estimation, and Doppler estimation for each configured non-QC/QCL antenna port.

There are advantages in that UE can perform the following operations between antenna ports capable of an assuming QC/QCL:

With respect to the Delay spread and Doppler spread, UE may identically apply the results of a power-delay profile, Delay spread and Doppler spectrum, and Doppler spread estimation for a wireless channel from any one antenna port to a Wiener filter which is used upon channel estimation for a wireless channel from other antenna ports.

With respect to the Frequency shift and received timing, UE may perform time and frequency synchronization on any one antenna port and then apply the same synchronization to the demodulation of other antenna ports.

With respect to the Average received power, UE may average reference signal received power (RSRP) measurement for two or more antenna ports.

For example, if a DMRS antenna port for downlink data channel demodulation has been subjected to QC/QCL with the CRS antenna port of a serving cell, UE may apply the large-scale property of a wireless channel estimated from its own CRS antenna port upon channel estimation through the corresponding DMRS antenna port, in the same manner, thereby improving reception performance of a DMRS-based downlink data channel.

The reason for this is that an estimation value regarding a large-scale property can be more stably obtained from a CRS because the CRS is a reference signal that is broadcasted with relatively high density every subframe and in a full bandwidth. In contrast, a DMRS is transmitted in a UE-specific manner with respect to a specific scheduled RB, and the precoding matrix of a precoding resource block group (PRG) unit that is used by an eNB for transmission may be changed. Thus, a valid channel received by UE may be changed in a PRG unit. Accordingly, although a plurality of PRGs has been scheduled in the UE, performance deterioration may occur when the DMRS is used to estimate the large-scale property of a wireless channel over a wide band. Furthermore, a CSI-RS may also have a transmission cycle of several~several tens of ms, and each resource block has also low density of 1 resource element for each antenna port in average. Accordingly, the CSI-RS may experience performance deterioration if it is used to estimate the large-scale property of a wireless channel.

That is, UE can perform the detection/reception, channel estimation, and channel state report of a downlink reference signal through a QC/QCL assumption between antenna ports.

Method for Sending and Receiving Data in Unlicensed Band

An embodiment of the present invention proposes a technology regarding a method for enabling UE to directly determine a transmission opportunity (TXOP) period or a reserved resource period (RRP) by detecting a specific signal (e.g., a preamble, a synchronous signal, a CRS, a CSI-RS, etc) through a process, such as blind detection, in a situation in which a signal is transmitted and received through a carrier of an unlicensed band.

Hereinafter, in this specification, a time period in which an eNB and UE have occupied/secured a corresponding carrier resource in order to send a signal through a carrier of an unlicensed band/spectrum is collectively called an RRP.

In this case, the RRP may be defined to be essentially limited to a single consecutive time period or may be defined as a set form of a plurality of consecutive time periods. For example, the RRP may include an unit of a symbol, a slot, a subframe, a radio frame, etc.

The name of a base station described in this specification is used as a comprehensive term, including a remote radio head (RRH), an eNB, a transmission point (TP), a reception point (RP), and a relay.

Hereinafter, a proposal method based on 3GPP LTE/LTE-A systems is described below, for convenience of description. However, the range of a system to which the proposal method is applied may be extended to other systems (e.g., UTRA) in addition to the 3GPP LTE/LTE-A systems.

As more and more communication devices demand larger communication capacity, effective utilization of limited frequency bands in future wireless communication systems is becoming an increasingly important requirement.

Accordingly, cellular communication system such as the LTE/LTE-A system is considering introducing a method for utilizing the unlicensed band such as the 2.4 GHz band used in the existing Wi-Fi system or the 5 GHz unlicensed band recently receiving attention for traffic offloading.

The unlicensed band by default assumes that communication nodes transmit and receive wireless signals through contention among them; therefore, each communication node is required to perform channel sensing before transmitting a signal in order to ensure other communication nodes do not perform signal transmission. This scheme is called CCA (Clear Channel Assessment), and an eNB or UE belonging to the LTE system may have to perform CCA to transmit a signal in the unlicensed band. Conversely, when an eNB or UE belonging to the LTE/LTE-A system transmits a signal, other communication nodes in the Wi-Fi system also have to perform CCA to avoid causing interference. For example, the WiFi standard (801.11ac) specifies the CCA threshold as −62 dBm for non-WiFi signals and −82 dBm for WiFi signals. This indicates that an STA or an AP does not transmit a signal to avoid causing interference if a signal other than a WiFi signal is received with signal power of more than, for example, −62 dBm. Specifically, if an STA or an AP in the WiFi system does not detect a signal larger than the CCA threshold for more than 4 μs, the STA or AP may perform CCA and signal transmission.

The present invention proposes a rule related to operating conditions in terms of Tx/Rx beam, which should be satisfied for channel sensing and signal transmission in a situation where communication nodes transmit and receive signals through carrier waves in the unlicensed band that does not allow an exclusive use thereof by a particular system. For example, the rule may be applied to such a situation illustrated in FIG. 16.

FIG. 10 illustrates carrier aggregation in the unlicensed band according to one embodiment of the present invention.

As shown in FIG. 10, an eNB may transmit a signal to a UE or the UE may transmit a signal to the eNB in the situation of aggregation of component carriers (CCs) (or cells) in a licensed band and CCs (or cells) in an unlicensed band.

In what follows, for the convenience of description, the licensed band is denoted as LTE-A band, and the unlicensed band is denoted as LTE-U band to be distinguished from the LTE-A band.

In what follows, in describing an embodiment of the present invention, for the convenience of description of a method proposed by the present invention, it is assumed that the UE is configured to perform wireless communication through two CCs from each of a licensed and an unlicensed band. As one example, the carrier component of the licensed band may be interpreted as a primary CC (PCC or PCell), and the carrier component of the unlicensed band may be interpreted as a secondary CC (SCC or SCell).

In this regard, the target system of the present invention may be called a license assisted access (LAA) system for the sake of convenience. LAA refers to the technology that integrates an LTE licensed band and an LTE unlicensed band into a single LTE band by using carrier aggregation.

However, the methods proposed by the present invention are not necessarily limited to the LAA system. The methods according to the present invention may be extended to such a situation in which a plurality of licensed bands and a plurality of unlicensed bands are utilized by carrier aggregation. Also, the methods according to the present invention may be extended to the case where signal transmission and reception between an eNB and a UE is performed only in an unlicensed band or the case where signal transmission and reception between an eNB and a UE is performed by carrier aggregation comprising licensed bands only. Also, the methods according to the present invention may be extended not only to the 3GPP LTE system but also to the system exhibiting different characteristics.

As described above, in the LTE-U band, the LBT (Listen-Before-Talk) rule by CCA operation has to be followed to transmit a signal. In other words, if a signal of which the level is larger than a specific CCA threshold is not detected for more than a predetermined sensing time period, signal transmission may be performed.

Partly similar to such "energy sensing" operation, the current LTE/LTE-A standard defines an operation for a UE to measure the amount of signal power received with respect to specific RE(s) or OFDM symbol(s) or subframe by performing RSSI (Received Signal Strength Indicator) measurement.

RSSI may be considered to be similar to "energy sensing" in a sense that it measures not only the desired signal power transmitted from a serving cell (or a specific serving transmission point (TP)) of the corresponding UE but also the total received energy including even the power of interference signals from neighboring cell(s)/TP(s). More specifically, the 3GPP TS 36.214 standard provides a definition related to RSRQ (Reference Signal Received Quality) as shown in Table 15 below, which also specifies a definition for the RSSI.

TABLE 15

| | |
|---|---|
| Definition | Reference Signal Received Quality (RSRQ) is defined as the ratio N × RSRP/(E-UTRA carrier RSSI), where N is the number of RB's of the E-UTRA carrier RSSI measurement bandwidth. The measurements in the numerator and denominator shall be made over the same set of resource blocks. E-UTRA Carrier Received Signal Strength Indicator (RSSI), comprises the linear average of the total received power |

TABLE 15-continued (in [W]) observed only in OFDM symbols containing reference symbols for antenna port 0, in the measurement bandwidth, over N number of resource blocks by the UE from all sources, including co-channel serving and non-serving cells, adjacent channel interference, thermal noise etc. If higher-layer signalling indicates certain subframes for performing RSRQ measurements, then RSSI is measured over all OFDM symbols in the indicated subframes.
The reference point for the RSRQ shall be the antenna connector of the UE.

Regarding the measurement position of RSRQ and RSSI, Table 15 above specifies that "the reference point for the RSRQ shall be the antenna connector of the UE".

Also, for the case in which the UE, being equipped with a plurality of receive antennas, applies receiver diversity, Table 15 above specifies that "the reported value shall not be lower than the corresponding RSRQ of any of the individual diversity branches".

If the CCA operation in the LTE-U band is considered, each eNB (or TP or UE) has to always perform "energy sensing" first before transmission operation; thus it needs to specify a definition or a limiting condition for the operation in the form similar to the specification above also in terms of the eNB (or TP or UE) receive antenna.

In particular, the energy sensing result may differ according to whether the eNB (or TP) receives a signal through a sectored antenna or by applying a specific Rx beam pattern.

Also, a vehicle-mounted terminal employing 'V2X (Vehicle to Everything)' technology may be equipped with a plurality of antennas; in this case, too, the energy sensing result may differ according to which Rx beam pattern the vehicle-mounted terminal uses.

In this case, for example, when the Rx beam pattern of the eNB applied to energy sensing is different from the Tx beam pattern for transmission after CCA, the beam area for CCA becomes different from the beam area of the Tx signal and may cause large interference on the communication in the surrounding environment.

To solve the situation above, the LAA system proposes a rule (namely a method) for performing to a specific transmission and reception operation as described below; transmitting and receiving a wireless signal in the LTE-U band has to be implemented so that it does not violate the rule described below.

The rule according to the present invention is as follows: the difference between the CCA range and the interference range for transmitting and receiving a wireless signal through an omni-directional antenna has to be maintained even when a directional antenna is used. In other words, the interference range is not allowed to become larger.

For example, suppose the emission power (or transmission power) is increased by X dB compared with the omni-directional antenna in a specific direction, and interference range is extended as much as the increase of the emission power.

(1) The sensitivity of CCA is increased by X dB.

For example, Rx gain is also increased by X dB, or the CCA threshold is lowered by X dB in the corresponding direction, which is applied for CCA.

(2) Total transmit power is decreased by X dB and applied for signal transmission.

Signal transmission after reducing the total transmit power by X dB gives an effect of reducing link budget. However, this operation brings an advantageous effect that the aforementioned directional antenna may be utilized for the purpose of reducing the total interference.

Similarly, a mixed application using the method (1) and (2) is also possible: X1 dB and X2 dB are assumed respectively for the method (1) and (2) to satisfy the total of X dB when they are summed (namely, X1+X2=X).

The example above will be described with reference to the related drawing.

FIG. 11 illustrates a method for transmitting and receiving wireless signals in an unlicensed band according to one embodiment of the present invention.

For the convenience of description, FIG. 11 does not take into account the beam direction when a directional antenna is used, and the CCA range and the interference range are indicated simply by circles. Also, it is assumed that the CCA range is larger than the interference range.

FIG. 11(a) illustrates the CCA range 1711 and the interference range 1712 when a transmitter (for example, eNB, TP, or UE) uses an omni-directional antenna. In case the transmitter uses an omni-directional antenna, the difference 1713 between the CCA range 1711 and the interference range 1712 may be determined by a specific value.

FIG. 11(b) illustrates a method for adjusting a difference between the CCA range and the interference range by using the method (1).

The interference range 1722 when the transmitter uses a directional antenna may be larger than the interference range 1712 when an omni-directional antenna is used. Accordingly, the difference 1724 between the CCA range 1721 and the interference range 1722 when using a directional antenna becomes smaller than the difference 1713 between the CCA range 1711 and the interference range 1712 when an omni-directional antenna is used.

Therefore, according to the present invention, as in the method (1) described above, a transmitter may improve sensitivity of CCA by increasing the receive gain or decreasing the CCA threshold. In other words, the transmitter may extend the CCA range 1721 like an adjusted CCA range 1723.

As described above, by extending the CCA range 1723, the difference 1725 between the CCA range 1723 and the interference range 1722 may be kept to be the same as the difference 1713 between the CCA range 1711 and the interference range 1712 when an omni-directional antenna is used.

FIG. 11(c) illustrates a method for adjusting the difference between the CCA range and the interference range by using the method (2) described above.

As described above, the interference range 1732 when the transmitter uses a directional antenna may be larger than the interference range 1712 when an omni-directional antenna is used. Accordingly, the difference 1734 between the CCA range 1731 and the interference range 1732 when a directional antenna is used becomes smaller than the difference 1713 between the CCA range 1711 and the interference range 1712 when an omni-directional antenna is used.

Therefore, according to the present invention, as in the method (2) described above, the transmitter may reduce the interference range by reducing the total transmit power. In other words, the transmitter may reduce the interference range 1732 like the adjusted interference range 1733.

As described above, by reducing the interference range 1733, the difference 1735 between the CCA range 1731 and the interference range 1733 may be kept to be the same as the difference 1713 between the CCA range 1711 and the interference range 1712 when an omni-directional antenna is used.

Also, as described above, by adjusting both of the CCA range and the interference range, the transmitter may keep the difference between the CCA range and the interference range to be the same as the difference between the CCA range and the interference range when an omni-directional antenna is used. In other words, the transmitter may extend the CCA range by improving the receive gain or lowering the CCA threshold and reduce the interference range by lowering transmit power.

As a result, through the proposal described above, when a directional antenna is used, CCA conditions may be applied differently (or independently) for specific beam directions. For example, according to which antenna gain pattern is employed to implement the corresponding transmit and receive antenna, the corresponding antenna gain for each beam direction may be determined as the X dB amounting to the difference from the antenna gain when an omni-directional antenna is used, for which implementation in the form of the operation described above may be applied.

In other words, in case the transmitter (for example, eNB, TP, or UE) uses a directional antenna, the antenna gain may be determined differently according to in which direction a beam pattern is formed (namely, according to the beam direction). In other words, the difference from the antenna gain of the omni-directional antenna may be determined differently according to the beam direction.

Therefore, if the transmitter applies the same CCA condition for all directions, CCA sensitivity may be relatively high in some direction while it may be relatively low in other direction.

Accordingly, to maintain the CCA sensitivity to be the same in all directions, the transmitter may apply different CCA conditions for specific beam directions.

At this time, the CCA condition refers to the criterion by which a radio medium (namely an unlicensed band) determines an occupied state (namely occupy or busy) due to other device (for example, a 3GPP device or 802.11 device) or an idle state.

That the antenna gain increases in a specific beam direction as the transmitter uses a directional antenna may be interpreted that the CCA range is increased in proportion to the increase of the antenna gain. In other words, by extending the CCA range as in the method (1) as much as the difference (for example, X dB) between the antenna gain of the directional antenna and the antenna gain of the omni-directional antenna, the transmitter may keep the difference between the CCA range and the interference range to be the same as that of using the omni-directional antenna.

Also, by lowering transmit power as in the method (2) as much as the difference (for example, X dB) between the antenna gain of the directional antenna and the antenna gain of the omni-directional antenna, the transmitter may keep the difference between the CCA range and the interference range to be the same as that of using the omni-directional antenna.

As described above, in case the transmitter uses a directional antenna, the antenna gain may be determined differently according to in which direction a beam pattern is formed (namely, according to the beam direction). Therefore, to keep the difference between the CCA range and the interference range to be the same as that of using an omni-directional antenna, the transmitter may adjust the CCA range and/or interference range differently (independently) along beam directions as in the method described above.

In terms of the antenna gain pattern described above, a rule may be applied, which states that the Rx beam pattern applied when the LAA system performs sensing for LBT (Listen-Before-Talk) be the same as the Tx beam pattern applied for transmission of a wireless signal after CCA, or the Tx beam pattern at least does not have a larger area than the Rx beam pattern.

In other words, a rule may be applied, which states that the CCA range be the same as the interference range, or at least the interference range does not have a larger area than the CCA range.

If such a rule is to be applied for implementing a transmitter, a specific limiting condition aimed for supporting the rule described above may be defined as a requirement for the transmitter, which has to be satisfied when the transmitter is implemented.

In general, the beam pattern described above may be formed to have a specific direction by using a plurality of antennas installed in a wireless communication apparatus, but the present invention may be applied in the same manner to the case in which only one antenna is installed in the wireless communication apparatus, and accordingly a beam pattern in a specific direction is formed.

In what follows, the beam pattern will be described.

FIG. 12 illustrates a beam pattern according to one embodiment of the present invention.

As shown in FIG. 12, a beam pattern may indicate mapping (namely virtualization) from physical antenna elements to a specific transceiver unit (TXRU).

Definitions of parameters used in FIG. 12 are as follows.

q is a Tx signal vector at the M co-polarized antenna elements within a column.

w and W respectively are wideband TXRU virtualization weight vector and matrix.

x is a TXRU signal vector.

The TXRU-to-element mapping of FIG. 12 is only an example, and the present invention is not limited to the specific example. The present invention may be applied in the same manner to the mapping between the TXRU and antenna elements that may be implemented in various other forms in terms of hardware.

In terms of antenna implementation, the w and W may be seen as a specific phase shifter or an embodiment of electrical tilting.

Besides, an embodiment in the form of mechanical tilting may be (additionally) applied so that transmit signals from the M antenna elements may be physically emitted to a target area along a specific direction.

The method according to the present invention may be applied to various forms of mapping between the TXRU and antenna elements as described above.

However, it should be noted that according to the present invention, antenna virtualization such as the TXRU-to-element mapping when a CCA operation due to sensing is performed in the LAA system and antenna virtualization when transmission of a wireless signal due to valid CCA (namely, determining that a medium is in the idle state) is initiated have to be maintained to be the same to each other.

Meanwhile, the present invention may apply by default (or additionally) a rule stating that the area lying in an emission direction of a transmit signal due to antenna virtualization applied at the time of initiating transmission of a wireless signal is not allowed to be wider than the area in an emission direction applied for CCA.

As a more specific example, the antenna elements and related TXRU(s) applied at the time of CCA and transmitting a wireless signal may not be determined so that different TXRUs may be used for the respective antenna elements. In other words, the condition described above may be satisfied by using the same antenna elements and related TXRU(s) commonly at the time of CCA and transmitting a wireless signal.

Meanwhile, given that descriptions with reference to FIG. 12 have been made in terms of hardware implementation, signals applied to the TXRU is first generated and provided through a baseband processor, where various beamforming methods due to digital precoding may be additionally applied to perform baseband signal processing. The digital precoding in the baseband unit may be dynamically determined by CSI feedback from the UE (in the case of the eNB), which is distinguished from the antenna virtualization in terms of hardware implementation.

To transmit a signal to which the digital precoding has been applied, by applying the operation rule according to the method (1) and (2), the transmit signal has to be transmitted under a limiting condition requiring that the target area to which the transmit signal is finally directed and the corresponding beam gain are the same as the directed area considered at the time of CCA and the corresponding beam gain; and/or the interference range is made not to become larger.

As an extended example of generalization, suppose an eNB having a large number of antenna elements (for example, 64 antenna elements) is implemented to cover a specific 120-degree sector area in a horizontal direction. In this case, the CCA operation may be performed over the whole 120-degree sector area, but (additionally) a signal transmission operation comprising virtually dividing the corresponding sector area into N sub-sector areas (for example, N=4), performing specific CCA operations for the respective sub-sectors, and in case CCA is valid only for specific sub-sector(s), applying beam forming only in directions targeted to the corresponding sub-sectors may be applied.

It should be noted that the operation described above may also be applied in a vertical direction. Also, by taking into account both of the horizontal and vertical areas, the operation may also be applied in the form of 3-dimensional beamforming. As described above, through an advanced operation, the present invention provides an advantage of improving efficiency of utilizing radio resources by subdividing channel sensing resources of the LAA system on the spatial domain and performing separate sensing and CCA operation (under the condition that the rule due to the method (1) and (2) is satisfied); and performing selective signal transmission only in the beam directions obtained from valid CCA.

FIG. 13 illustrates a method for transmitting a wireless signal in an unlicensed band according to one embodiment of the present invention.

Referring to FIG. 13, a wireless communication apparatus (for example, an eNB, TP, and UE) performs CCA in an unlicensed band S1301.

Before starting transmission of a wireless signal, the wireless communication apparatus performs CCA (Clear Channel Assessment) for sensing a radio channel or a medium in an unlicensed band. In other words, the wireless communication apparatus performs energy sensing of a received signal irrespective of whether the received signal is the desired signal that the apparatus wants to receive or an interference signal. For example, the wireless communication apparatus may perform CCA by measuring RSSI of the radio channel or the medium in the unlicensed band.

At this time, the wireless communication apparatus may perform CCA only for the cell(s) allocated thereto within the unlicensed band.

At this time, the wireless communication apparatus may perform CCA for a predetermined time period. For example, the wireless communication apparatus may perform CCA for one or more symbol periods, slot periods, or subframe periods; and may perform CCA for a predetermined time period defined by the 802.11 (for example, DIFS (DCF Inter-Frame Space)).

When the unlicensed band is determined from the CCA as being in the idle state not occupied by other wireless communication devices, the wireless communication apparatus transmits a wireless signal in the unlicensed band S1302.

At this time, when the wireless communication apparatus uses a directional antenna, a first difference between the CCA range and the interference range when a wireless signal is transmitted and received using a directional antenna is adjusted to be the same as a second difference between the CCA range and the interference range when a wireless signal is transmitted and received using an omni-directional antenna.

At this time, the first difference may be adjusted to be the same as the second difference based on the increment in the amount of emission power in a specific direction when a directional antenna is used compared with the emission power when an omni-directional antenna is used.

For example, the first difference may be adjusted to be the same as the second difference by extending the CCA range either by increasing the antenna receive gain as much as the emission power is increased when a directional antenna is used or by lowering the CCA threshold in the corresponding direction.

As another example, the first difference may be adjusted to be the same as the second difference by reducing the interference range by reducing transmit power as much as the emission power is increased when a directional antenna is used.

As a yet another example, the first difference may be adjusted to be the same as the second difference by adjusting the CCA range and the interference range together. More specifically, the first difference may be adjusted to be the same as the second difference by extending the CCA range either by increasing the antenna receive gain by a portion of the increased emission power when a directional antenna is used or by lowering the CCA threshold, and by reducing the interference range by reducing the transmit power as much as the remaining portion of the increased emission power.

Also, the first difference may be adjusted to be the same as the second difference based on the increment of the antenna gain in a specific direction when a directional antenna is used compared with the antenna gain when an omni-directional antenna is used.

For example, the first difference may be adjusted to be the same as the second difference by reducing the interference range by reducing transmit power as much as the antenna gain is increased when a directional antenna is used.

As described above, the antenna gain may vary according to beam directions compared when an omni-directional antenna is used. Therefore, CCA conditions may be determined independently for the respective beam directions. Also, the first difference may be adjusted to be the same as the second difference independently for the respective beam directions.

In terms of an antenna gain pattern, the receive beam pattern applied when CCA is performed may be smaller than or equal to the transmit beam pattern used when the wireless signal is transmitted after the CCA is performed.

Meanwhile, the wireless communication apparatus does not start transmission if the medium is detected as being in an occupied status but may retry transmitting a wireless signal after waiting for a delay time (for example, a random backoff period) for medium access in addition to a predetermined time period under the assumption that other devices are already waiting to use the corresponding medium.

Tx Beam Sweeping and Tx Multi-Beams

As described previously, when beamforming using a directional antenna, the transmitter may keep/adjust the difference between a CCA range and an interference range the same as when an omni-directional antenna is used, by decreasing the CCA threshold, using directive CCA, or decreasing the transmit power.

However, besides the above-described embodiment, an embodiment may be proposed in which the difference between the CCA range and the interference range is maintained, without increasing the interference range, by using Tx beam sweeping or Tx multi-beams. Prior to proposing such an embodiment, it can be assumed that total radiated power (or transmit power), instead of PSD (power spectral density), is given as a predetermined restriction for beamforming using a directional antenna.

In this regard, the network may perform scheduling using frequency domain Tx beam sweeping or Tx multi-beams. In this case, the transmitter may keep the difference between the CCA range and the interference range the same as when an omni-directional antenna is used, without decreasing the CCA threshold, and may also maintain the aggressive radiated power.

Here, the Tx multi-beams may refer to a scheme in which a directional antenna transmits wireless signals through a plurality of beams. In this case, the network (or scheduler) may perform Tx multi-beams scheduling in order to perform Tx multi-beams under a predetermined restriction. The Tx multi-beams scheduling may represent a scheme in which total radiated power under a restriction is allocated for different beams of a directional antenna.

For example, if the Tx multi-beams are used, the scheduler may generate four orthogonal multi-user beams and allocate ¼ of the total radiated power to each of the four beams directed towards four users. In this case, there is no directional beamforming at the base station, but each user may have an increase of about 6 dB in beamforming gain.

Also, the frequency domain Tx beam sweeping may refer to a scheme in which wireless signals transmitted through a plurality of beams by a directional antenna are transmitted through different frequency resources for different beams. In this case, the network (or scheduler) may perform frequency domain Tx beam sweeping scheduling in order to perform frequency domain Tx beam sweeping under a predetermined restriction. The frequency domain Tx beam sweeping scheduling may represent a scheme in which the total system bandwidth is allocated for different beams of a directional antenna.

For example, if the frequency domain Tx beam sweeping is applied, the scheduler may generate four orthogonal multi-user beams and allocate ¼ of the system bandwidth to each of the four beams directed towards four users. In this case, the system bandwidth may have power four times greater than the PSD. That is, the scheduler may allocate/schedule each individual frequency resource of a wireless signal transmitted for each beam direction over the system bandwidth divided by the total number of beams.

Also, it can be assumed that a total radiated power (or transmit power) to be radiated "during a specific time duration" is given as a predetermined restriction for beamforming using a directional antenna. In this case, the network may perform scheduling using time domain Tx beam sweeping.

Here, the time domain Tx beam sweeping may refer to a scheme in which wireless signals transmitted through a plurality of beams by a directional antenna are transmitted through different time resources (or different subframes) for different beams. In this case, the network (or scheduler) may perform time domain Tx beam sweeping scheduling in order to perform time domain Tx beam sweeping under a predetermined restriction. Similarly to the aforementioned frequency domain Tx beam sweeping scheduling, the time domain Tx beam sweeping scheduling may represent a scheme in which different time resources are allocated for different beam directions of a directional antenna.

In this way, the transmitter may maintain the aggressive radiated power without decreasing the CCA threshold by performing scheduling using the aforementioned frequency/time domain Tx beam sweeping or TX multi-beams.

The aforementioned frequency/time domain Tx beam sweeping or TX multi-beams scheduling may be performed independently or in combination.

The frequency/time domain Tx beam sweeping or TX multi-beams may be applied/implemented under a predetermined restriction (e.g., a preset total radiated power) through proper scheduling. Thus, the following restriction may be specified in a standards document and given as a transmission/radiation condition that must be met.

The difference between the CCA (sensing) range and the interference (by transmission) range for reception and transmission using a specific reference antenna (e.g., an omni-directional antenna) should be maintained (or the interference range should not be increased), even when a directional antenna is used (or dynamic beamforming is applied).

That is, if the transmitter wants to transmit a signal using a directional antenna (or wants to perform transmission using dynamic beamforming), the aforementioned frequency/time domain Tx beam sweeping scheduling and/or TX multi-beams scheduling should be performed to meet the above transmission/radiation condition.

In this case, it is possible to determine whether the transmission/radiation condition is met using the radiated/transmitted power (or energy) obtained by averaging transmit power values of beams transmitted within a specific frequency region (e.g., system bandwidth) as a metric (or measurement criterion). And/or, it is possible to determine whether the transmission/radiation condition is met, by using the radiated/transmitted power (or energy) obtained by averaging transmit power values of beams transmitted within a specific time region (e.g., a preset time window for a D (ms) period) as a metric (or measurement criterion).

In order to perform scheduling more effectively and smoothly while satisfying the aforementioned transmission/radiation condition, a variety of enhancement techniques may be supported for a control signal including a scheduling grant, CSI feedback and reporting, and/or inter-cell cooperative signaling exchange.

For example, if frequency domain Tx beam sweeping scheduling is used when transmitting a scheduling grant, a plurality of candidate scheduling hypothesis sets may be preset by higher-layer signaling (e.g., a specific frequency region may be divided into N equal parts and frequency-multiplexed between users). In this case, the scheduler may dynamically indicate one of these sets to each terminal through a scheduling grant (in order to indicate the size of an individual transmission bandwidth for each user/beam direction). In this case, the resource allocation (RA) field may be designed as a field that indicates/takes into account/ reflects the aforementioned divisional allocation of frequency resources for each user (or each beam direction).

The reporting type and/or mode of CSI feedback and reporting from a terminal may also be designed by taking the aforementioned frequency domain Tx beam sweeping scheduling into account. In particular, for periodical CSI feedback, the CSI/feedback reporting unit (granularity) may be defined/set by taking into account the divisional allocation of frequency resources for each beam direction (or the size of an individual transmission bandwidth for each beam direction). Also, beam selection information, frequency resource allocation information, etc. may be exchanged through inter-cell cooperative signaling exchange in such a way that frequency domain Tx beam sweeping can minimize inter-cell interference.

The above description has been made with respect to frequency domain Tx beam sweeping scheduling, but not limited thereto, and a variety of enhancement techniques may be supported for time domain Tx beam sweeping scheduling and/or Tx multi-beams scheduling too, as in the above-described example.

For example, for time domain Tx beam sweeping scheduling, time-domain resource allocation-related control signaling (e.g., multi-subframe scheduling grant with optimized TDM patterns, time-domain resource allocation signaling exchange between cells, etc.) may be supported.

In another example, for Tx multi-beams scheduling, MU MIMO feedback enhancement with pre-defined beam sets to be used for multi-beam transmission may be supported.

Meanwhile, for a combination of the aforementioned frequency/time domain Tx beam sweeping and/or Tx multi-beams scheduling, a joint restriction may be additionally given.

For example, for CSI feedback reporting from a terminal that takes into account both frequency domain Tx beam sweeping scheduling and Tx multi-beams scheduling, the terminal may select a specific frequency (sub-band) region from among pre-defined/preset sets and also select a specific PMI (pre coding matrix indicator) to use for the selected frequency region from among pre-defined/preset sets. That is, there may exist a joint restriction that requires the PMI and the frequency region to be selected from among preset sets.

Accordingly, in the case of CSI feedback reporting for frequency domain Tx beam sweeping scheduling and Tx multi-beams scheduling, the terminal has to select a frequency region (sub band) from among pre-defined/preset sets and may also follow a joint restriction that requires the PMI for the selected frequency region to be selected from among pre-defined/preset sets.

CCA Metric Calculation Method for Apparatus Using Multi-Antennas

When a wireless communication apparatus including multi-antennas performs CCA, there may be an ambiguity about with which antenna an energy sensing indicator is to be obtained and used for CCA. Accordingly, a metric setting/calculation method for CCA by a wireless communication apparatus using multi-antennas is proposed to solve this ambiguity. In this specification, a metric may also be referred to as a reference value.

The metric setting/calculation method proposed below may be used primarily when the wireless communication apparatus receives a signal by an omni-directional antenna and performs CCA. An energy sensing indicator (hereinafter, 'ESI') for the omni-directional antenna may be defined as follows.

ESI (Energy sensing indicator): The received wide band power, including thermal noise and noise generated in the receiver, within the bandwidth defined by the receiver pulse shaping filter. The reference point for the measurement shall be the antenna connector of the device (e.g., UE, eNB).

The ESI is defined as such, and it can be assumed that a device performing CCA includes a plurality of antennas Ant1 and Ant2. In this case, ESI1 may be measured through Ant1, and ESI2 may be measured through Ant2. If a CCA threshold for CCA is expressed as T (dB), a metric P to be compared with T may be determined according to various embodiments below.

(1) Option 1

According to an embodiment, the metric P may be determined by the following Equation 12:

$$P=\max(ESI1, ESI2) \qquad \text{[Equation 12]}$$

Referring to Equation 12, the largest between ESI1 and ESI2 may be determined/selected as the metric (P) to be compared with the CCA threshold. When generalized, the wireless communication apparatus may perform CCA by determining the largest among the ESIs obtained through multi-antennas as a metric and comparing the determined metric with the CCA threshold.

According to this embodiment, it can be more difficult to succeed in CCA since the largest among the ESIs is selected as a metric. In this specification, the success of CCA may mean that an unlicensed band is assessed as idle state as a result of CCA. That is, according to this embodiment, the transmission probability over the entire network is relatively low since the metric value to be compared with the CCA threshold is increased, but the probability of inter-signal collision/interference is decreased that much, thereby achieving high network stability.

(2) Option 2

According to an embodiment, the metric P may be determined by the following Equation 16:

$$P=\min(ESI1, ESI2) \qquad \text{[Equation 13]}$$

Referring to Equation 13, the smallest between ESI1 and ESI2 may be determined/selected as the metric (P) to be compared with the CCA threshold. When generalized, the wireless communication apparatus may perform CCA by determining the smallest among the ESIs obtained through multi-antennas as a metric and comparing the determined metric with the CCA threshold.

According to this embodiment, the wireless communication apparatus performs very aggressive CCA operation, contrary to Option 1, since it selects the smallest among the ESIs as a metric. That is, the wireless communication apparatus compares the lowest ESI among a plurality of measured ESIs (or from a number of receive branches) with the CCA threshold, so the probability of success in CCA is increased that much. Accordingly, this embodiment may be properly used in an environment where the probability of inter-signal collision/interference is relatively low and in an environment where the loading is low, and the transmission probability over the entire network is increased particularly unless the inter-signal collision/interference situation is severe.

(3) Option 3

According to an embodiment, the metric P may be determined by the following Equation 14:

$$P = \mathrm{avg}(ESI1, ESI2) = (ESI1 + ESI2)/2 \qquad [\text{Equation 14}]$$

Referring to Equation 14, the average of ESI1 and ESI2 may be determined/selected as the metric (P) to be compared with the CCA threshold. When generalized, the wireless communication apparatus may perform CCA by determining the average of the ESIs obtained through multi-antennas as a metric and comparing the determined metric with the CCA threshold. This embodiment may be seen as a median between Options 1 and 2.

(4) Option 4

According to an embodiment, the metric P may be determined by the following Equation 15:

$$P = w1 * ESI1 + w2 * ESI2 \qquad [\text{Equation 15}]$$

In equation 15, the w1 and w2 are weight averages, which may be variously selected for implementation by the wireless communication apparatus (e.g., a base station or terminal) (there may be specific candidate values for selecting w1 and w2). Alternatively, w1 and w2 may be set/signaled by other communication apparatuses.

When generalized, the wireless communication apparatus may perform CCA by determining the weight average of the ESIs obtained through multi-antennas as a metric and comparing the determined metric with the CCA threshold. This embodiment may be seen as a more generalized form than Options 1 to 3.

(5) Option 5

According to an embodiment, the metric P may be determined by the following condition:

P is set to be no less than any of ESI1 and ESI2 (P shall not be lower than the corresponding ESI of any of the individual receive antenna branches).

In this embodiment, Option 5 takes another form of Option 1, and the precise value to be taken as the metric may be determined according to an implementation of the wireless communication apparatus, as long as the metric is no less than any of ESI1 and ESI2. Accordingly, according to this embodiment, the flexibility of implementation of the wireless communication apparatus can be improved.

The CCA threshold to be compared with the metric in the aforementioned options may be fixed to a specific value in a standard/specification, or may be defined/set to be signaled directly by a specific device (e.g., a base station, a serving-base station/cell, etc.).

For example, only the maximum value T_max of the CCA threshold may be fixed in a standard/specification, and a CCA threshold T' not exceeding the maximum value T_max may be set/signaled for/to a device (e.g., a terminal, a base station, etc.) that performs CCA. A device to which T'(<T_max) is signaled may perform CCA by comparing T', instead of T_max, with the metrics obtained through the above Options 1 to 5, and may transmit a signal by deeming CCA as successful if P<T'.

T' may be set/signaled by higher-layer signaling (e.g., by RRC) or may be signaled/modified by dynamic signaling (e.g., by DCI or MAC). Also, when multiple candidate values for the T' setting are preset by higher-layer signaling, it is possible to trigger which of these values is activated by DCI or MAC CE signaling. Once a new T' value is activated, then the wireless communication apparatus uses the activated T' value for CCA.

FIG. 14 is a flowchart of a method for transmitting a wireless signal in an unlicensed band according to an embodiment of the present invention. A detailed description relating to this flowchart may be given in the same or similar way to the above description relating to the foregoing embodiment, and redundant descriptions will be omitted.

First of all, a wireless communication apparatus may perform CCA using a plurality of antennas for a predetermined time duration in an unlicensed band (S1410). In this case, when a wireless communication apparatus including multi-antennas performs CCA, there is an ambiguity about with which antenna an ESI is to be obtained and used. Accordingly, various embodiments may be proposed to solve this ambiguity. For example, the wireless communication apparatus may determine the largest, smallest, or average value among the ESIs measured/obtained through a plurality of antennas as a reference value (or metric) to be compared with a CCA threshold. Alternatively, the wireless communication apparatus may determine a value no less than any of the ESIs measured/obtained through a plurality of antennas as a reference value (or metric) to be compared with a CCA threshold. In this case, the CCA threshold may be signaled/set by higher-layer signaling.

Next, when the result of the step S1410 shows that an unlicensed band is determined as an idle state where the unlicensed band is unoccupied by other wireless communication apparatuses, the wireless communication apparatus may transmit a wireless signal through the corresponding unlicensed band (S1420).

when the wireless communication apparatus uses a directional antenna, a first difference between a CCA range and an interference range when the wireless signal is transmitted and received using the directional antenna may be kept the same as a second difference between the CCA range and the interference range when the wireless signal is transmitted and received using an omni-directional antenna.

Moreover, when a radiation condition related to a total radiated power value for each beam direction is set, an individual radiated power value/individual transmission bandwidth size/individual time resource for each beam direction may be scheduled to meet the corresponding radiation condition. More specifically, Tx multi-beams scheduling and frequency/time domain Tx beam sweeping scheduling may be used, and a detailed description of each scheduling is as described previously.

General Apparatus to which an Embodiment of the Present Invention May be Applied FIG. 15 illustrates a block diagram of a wireless communication apparatus according to an embodiment of the present invention.

Referring to FIG. 15, the wireless communication system includes an eNB 1510 and a plurality of pieces of UE 1520 located within the area of the eNB 1510.

The eNB 1510 includes a processor 1511, memory 1512, and a radio frequency (RF) unit 1513. The processor 1511 implements the functions, processes and/or methods proposed in FIGS. 1 to 12. The layers of a wireless interface protocol may be implemented by the processor 1511. The memory 1512 is connected to the processor 1511 and stores various pieces of information for driving the processor 1511. The RF unit 1513 is connected to the processor 1511 and transmits and/or receives a radio signal.

The UE 1520 includes a processor 1521, memory 1522, and an RF unit 1523. The processor 1521 implements the functions, processes and/or methods proposed in FIGS. 1 to 19. The layers of a wireless interface protocol may be implemented by the processor 1521. The memory 1522 is connected to the processor 1521 and stores various pieces of information for driving the processor 1521. The RF unit 1523 is connected to the processor 1521 and transmits and/or receives a radio signal.

The memory 1512, 1522 may be inside or outside the processor 1511, 1521 and connected to the processor 1511, 1521 by various well-known means. Furthermore, the eNB 1510 and/or the UE 1520 may have a single antenna or multiple antennas.

In the aforementioned embodiments, the elements and characteristics of the present invention have been combined in specific forms. Each of the elements or characteristics may be considered to be optional unless otherwise described explicitly. Each of the elements or characteristics may be implemented in such a way as to be not combined with other elements or characteristics. Furthermore, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

An embodiment of the present invention may be implemented by various means, for example, hardware, firmware, software or a combination of them. In the case of implementations by hardware, an embodiment of the present invention may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be located inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being limitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

A scheme for sending and receiving wireless signal in an unlicensed band in a wireless communication system according to an embodiment of the present invention has been chiefly illustrated as being applied to a 3GPP LTE/LTE-A system, but may be applied to various wireless communication systems in addition to the 3GPP LTE/LTE-A system.

The invention claimed is:
1. A method for a wireless communication apparatus comprising a plurality of antennas to transmit and receive a wireless signal in an unlicensed band in a wireless communication system, the method comprising:
    performing CCA(Clear Channel Assessment) using the plurality of antennas for a predetermined time duration in the unlicensed band;
    wherein the performing CCA comprises:
        obtaining a reference value based on energy sensing indicators (ESIs) measured through each of the plurality of antennas; and
        determining whether the unlicensed band is in an idle state where the unlicensed band is unoccupied by other communication apparatuses, by comparing the reference value with a CCA threshold,
    when the unlicensed band is determined as the idle state, transmitting the wireless signal through the unlicensed band; and
    when the plurality of antennas is configured to a directional antenna, keeping a first difference the same as a second difference,
    wherein the first difference is a difference between a CCA range and an interference range when the wireless signal is transmitted and received using the directional antenna,
    wherein the second difference is a difference between the CCA range and the interference range when the wireless signal is transmitted and received using an omni-directional antennas.
2. The method of claim 1, wherein the reference value is set as the largest, smallest, or average value among the ESIs measured through each of the plurality of antennas.
3. The method of claim 1, wherein the reference value is set to a value no less than any of the ESIs measured through each of the plurality of antennas.
4. The method of claim 1, wherein the CCA threshold is preset by higher-layer signaling.
5. The method of claim 1, wherein, when a radiation condition related to a total radiated power value is set, an individual radiated power value for each beam direction when a plurality of beams are transmitted is determined as the total radiated power value divided by the number of beams.
6. The method of claim 1, wherein, when a radiation condition related to a total radiated power value is set, an individual transmission bandwidth for each beam direction when a plurality of beams are transmitted is determined as the total system bandwidth divided by the number of beams.
7. The method of claim 6, further comprising determining whether the radiation condition is met or not based on an average radiated power value obtained by averaging transmit power values of beams transmitted within a preset frequency region.
8. The method of claim 6, wherein, while a plurality of candidate scheduling hypothesis sets are preset by higher-layer signaling, the size of the individual transmission bandwidth is indicated as one of the candidate scheduling hypothesis sets through a scheduling grant.
9. The method of claim 6, wherein, when a periodic CSI (channel state information) feedback is performed, a CSI feedback reporting frequency granularity is set by taking into account the size of the individual transmission bandwidth.
10. The method of claim 6, wherein, when CSI feedback is performed, a subband for CSI feedback is selected as one of pre-defined subband sets, and a PMI(pre coding matrix indicator) to be applied for the selected subband set is selected as one of pre-defined PMI sets.

11. The method of claim 1, wherein, when a radiation condition related to a total radiated power value for each beam direction to be radiated during a specific time duration is set, the wireless signal is transmitted in the total radiated power value for each beam direction, but through different time resources.

12. The method of claim 11, wherein the different time resources are indicated by a base station through a multi-subframe scheduling grant, or
wherein the different time resources are set through inter-cell cooperative signaling exchange.

13. The method of claim 11, further comprising determining whether the radiation condition is met or not based on an average radiated power value obtained by averaging transmit power values of beams transmitted within a preset time.

14. A wireless communication apparatus for transmitting and receiving a wireless signal in an unlicensed band in a wireless communication system, comprising:
  an RF(Radio Frequency) unit configured to transmit and receive a wireless signal,
  wherein the RF unit includes a plurality of antennas; and
  a processor functionally connected to the RF unit,
  wherein the processor is configured to:
  perform CCA (Clear Channel Assessment) using the plurality of antennas for a predetermined time duration in the unlicensed band;
  wherein the perform CCA includes:
    obtain a reference value based on energy sensing indicators (ESIs) measured through each of the plurality of antennas;
    determine whether the unlicensed band is in an idle state where the unlicensed band is unoccupied by other communication apparatuses, by comparing the reference value with a CCA threshold,
  transmit the wireless signal through the unlicensed band when the unlicensed band is determined as the idle state; and
  when the plurality of antennas is configured to a directional antenna, keep a first difference the same as a second difference,
  wherein the first difference is a difference between a CCA range and an interference range when the wireless signal is transmitted and received using the directional antenna,
  wherein the second difference is a difference between the CCA range and the interference range when the wireless signal is transmitted and received using an omni-directional antennas.

15. The method of claim 1, further comprising,
when the interference range is changed,
changing at least one of a sensitivity of the ESI, the CCA threshold and/or a transmission power of the wireless signal.

* * * * *